(12) United States Patent
Coulombe et al.

(10) Patent No.: US 8,300,961 B2
(45) Date of Patent: Oct. 30, 2012

(54) METHOD AND SYSTEM FOR LOW COMPLEXITY TRANSCODING OF IMAGES WITH NEAR OPTIMAL QUALITY

(75) Inventors: Stéphane Coulombe, Brossard (CA);
Steven Pigeon, Blainville (CA)

(73) Assignee: Ecole de Technologie Superieure, Montreal (CA)

( * ) Notice: Subject to any disclaimer, the term of this patent is extended or adjusted under 35 U.S.C. 154(b) by 907 days.

(21) Appl. No.: 12/333,406

(22) Filed: Dec. 12, 2008

(65) Prior Publication Data

US 2010/0150459 A1 Jun. 17, 2010

(51) Int. Cl.
*G06K 9/36* (2006.01)
*G06K 9/46* (2006.01)

(52) U.S. Cl. ....................................................... 382/232

(58) Field of Classification Search .................. 382/173, 382/190, 232, 233, 235, 238, 243; 375/240.01, 375/240.03, 240.08, 240.1, 240.12, 240.24, 375/240.25, E07.092, E7.198; 341/50, 51, 341/60; 704/201, 219, 230; 707/514
See application file for complete search history.

(56) References Cited

U.S. PATENT DOCUMENTS

| | | | |
|---|---|---|---|
| 6,154,572 A | 11/2000 | Chaddha | |
| 6,233,359 B1 | 5/2001 | Ratnakar | |
| 6,421,467 B1 | 7/2002 | Mitra | |
| 6,490,320 B1 * | 12/2002 | Vetro et al. | 375/240.08 |
| 6,563,517 B1 | 5/2003 | Bhagwat | |
| 6,990,146 B2 * | 1/2006 | Chen | 375/240.13 |
| 6,992,686 B2 | 1/2006 | Nagarajan | |
| 7,142,601 B2 | 11/2006 | Kong et al. | |
| 7,177,356 B2 * | 2/2007 | Moni et al. | 375/240.01 |
| 7,245,842 B2 | 7/2007 | Hino | |
| 7,440,626 B2 * | 10/2008 | Kong et al. | 382/232 |
| 7,583,844 B2 | 9/2009 | Fehmi et al. | |
| 7,668,397 B2 | 2/2010 | Le Dinh | |
| 7,805,292 B2 * | 9/2010 | Huo et al. | 704/201 |
| 8,073,275 B2 | 12/2011 | Shatz et al. | |
| 2003/0161541 A1 | 8/2003 | Ridge | |
| 2003/0227977 A1 | 12/2003 | Henocq | |
| 2004/0220891 A1 | 11/2004 | Dodgson | |
| 2007/0160133 A1 | 7/2007 | Bao et al. | |
| 2007/0239634 A1 | 10/2007 | Tian | |

(Continued)

FOREIGN PATENT DOCUMENTS

EP 1615447 A1 1/2006

(Continued)

OTHER PUBLICATIONS

Avcibas, Ismail; Sankur, Bulent and Sayood, Khalid "Statistical Evaluation of Image Quality Measures" Journal of Electronic Imaging, vol. 11, No. 2, pp206-223, Apr. 2002.

(Continued)

*Primary Examiner* — Amir Alavi
(74) *Attorney, Agent, or Firm* — IP-MEX Inc.; Victoria Donnelly

(57) ABSTRACT

Method and system for low complexity transcoding of images with near optimal quality for display on a terminal are presented. Generating effective transcoding parameters prior to transcoding and retrieving the transcoding parameters based on the features of the input image and the characteristics of the terminal, an output image quality close to that produced by optimal quality transcoding is achieved. The processing time is much smaller in comparison to that required for optimal quality transcoding.

37 Claims, 14 Drawing Sheets

U.S. PATENT DOCUMENTS

| | | | |
|---|---|---|---|
| 2008/0123741 A1* | 5/2008 | Li et al. | 375/240.12 |
| 2008/0279275 A1 | 11/2008 | Suzuki | |
| 2009/0016434 A1 | 1/2009 | Amonou et al. | |
| 2009/0141990 A1* | 6/2009 | Pigeon et al. | 382/233 |
| 2009/0141992 A1* | 6/2009 | Coulombe et al. | 382/235 |
| 2010/0150459 A1* | 6/2010 | Coulombe et al. | 382/232 |

FOREIGN PATENT DOCUMENTS

| | | |
|---|---|---|
| WO | 0169936 A2 | 9/2001 |
| WO | WO 2006/085301 | 8/2006 |
| WO | WO 2006085301 | 8/2006 |
| WO | WO 2006/097144 | 9/2006 |
| WO | WO 2006094000 | 9/2006 |
| WO | WO 2006110975 | 10/2006 |
| WO | 2009055899 A1 | 5/2009 |

OTHER PUBLICATIONS

3GPP in 3GPP TS 23.140 V6.14.0 (Nov. 6, 2006) Technical Specification 3rd Generation Partnership Project; Technical Specification Group Core Network and Terminals; Multimedia Messaging Service (MMS); Functional description; Stage 2 (Release 6) at http://www.3gpp.org/ftp/Specs/html-info/23140.htm (document http://www.3gpp.org/FTP/Specs/archive/23_series/23.140/23140-6e0.zip).

Multimedia Messaging Service, Media formats and codecs 3GPP TS 26.140, V 7.1.0, http:// www.3gpp.org/ftp/specs/html-info/26140.htm, Jun. 2007.

"The independent JPEG Group" ftp.uu.net/graphics/jpeg/jpegsrc.v6b.tar.gz, Aug. 3, 2007.

S. Coulombe and G. Grassel, "Multimedia adaptation for the multimedia messaging service," IEEE Communications Magazine, vol. 42, No. 7, pp. 120-126, Jul. 2004.

Z. Lei and N.D. Georganas, "Accurate bit allocation and rate control for DCT domain video transcoding," in IEEE CCECE 2002. Canadian Conference on Electrical and Computer Engineering, vol. 2, pp. 968-973, 2002.

J. Ridge, "Efficient transform-domain size and resolution reduction of images," Signal Processing: Image Communication, vol. 18, No. 8, pp. 621-639, Sep. 2003.

Pigeon, S., Coulombe, S. "Very Low Cost Algorithms for Predicting the File Size of JPEG Images Subject to Changes of Quality Factor and Scaling" Data Compression Conference p. 528, 2008.

Pigeon, S., Coulombe, S. "Computationally Efficient Algorithms for Predicting the File Size of JPEG Images Subject to Changes of Quality Factor and Scaling" Proceedings of the 24th Queens Biennial Symposium on Communications, Queen's University, Kingston, Canada, 2008.

S. Chandra and C. S. Ellis "JPEG Compression Metric as a Quality Aware Image Transcoding" Proceedings of USITS' 99: The 2nd USENIX Symposium on Internet Technologies and Systems, Boulder, Colorado, USA, Oct. 11-14, 1999.

A. Vetro, C. Christopoulos, and H. Sun, "Video transcoding architectures and techniques: an overview," IEEE Signal Processing Magazine, vol. 20, No. 2, pp. 18-29, Mar. 2003.

S. Grgi'C', M. Grgi'C, and M. Mrak, "Reliability of objective picture quality measures," Journal of Electrical Engineering, vol. 55, No. 1-2, pp. 3-10, 2004.

OMA Multimedia Messaging Service, Architecture Overview, Approved Version 1.2 01, published by Open Mobile Alliance, available from http://www.openmobilealliance.org/release_program/mms_v1_2.html Mar. 2005.

Wang, Z., Bovic, A., Rahim, H., Sheikh, Simoncelli, E. "Image Quality Assessment: From Error Visibility to Structural Similarity" IEEE Transactions on Image Processing, vol. 13, No. 4, pp. 600-612, Apr. 2004.

Lane, T., Gladstone, P., Ortiz, L., Boucher, J., Crocker L., Minguillon, J., Phillips, G., Rossi, D., Weijers, G., "The Independent JPEG Group Software Release 6b" 1998.

JPEG—Wikipedia, the free encyclopedia, http://en.wikipedia.org/wiki/JPEG, Aug. 5, 2007.

Wang, Y. et al: "Utility-Based Video Adaptation for Universal Multimedia Access (UMA) and Content-Based Utility Function Prediction for Real-Time Video Transcoding", IEEE Transactions on Multimedia, IEEE Service Center, Piscataway, NJ, U.S. vol. 9, No. 2, Feb. 1, 2007, pp. 213-220, XP011346385, ISSN: 1520-9210, DOI: 10.1109/ TMM.2006.886253.

Coulombe S. et al: "Low-Complexity Transcoding of JPEG Images With Near-Optimal Quality Using a Predictive Quality Factor and Scaling Parameters", IEEE Transactions on Image Processing, IEEE Service Center, Piscataway, NJ, US. vol. 18, No. 3, Mar. 1, 2010, pp. 712-721, XP011297927, ISSN: 1057-7149.

Reed E C et al, "Optimal multidimensional bit-rate control for video communication", IEEE Transactions on Image Processing, vol. 11, No. 8, Aug. 1, 2002, pp. 873-885.

Ta-Peng Tan et al, "On the methods and application of arbitrarily downsizing video transcoding", Multimedia and Expo, 2002. ICME '02. Proceedings. 2002 IEEE International Conference on Lausanne, Switzerland Aug. 26-29, 2002, Piscataway, NJ, USA. IEEE US vol. 1, Aug. 26, 2002, pp. 609-612.

Haiyan Shu et al, "Frame Size Selection in Video Downsizing Transcoding Application", Conference Proceedings/IEEE International Symposium on Circuits and Systems (ISCAS): May 23-26, 2005, May 23, 2005, pp. 896-899.

Haiwei Sun et al, "Fast motion vector and bitrate re-estimation for arbitrary downsizing video transcoding", Proceedings of the 2003 International Symposium on Circuits and Systems (ISCAS), 2003. vol. 2, Jan. 1, 2003, pp. II-856.

Shu H et al, "The Realization of Arbitrary Downsizing Video Transcoding", IEEE Transaction on Circuits and Systems for Video Technology, IEEE Service Center, vol. 16, No. 4, Apr. 1, 2006, pp. 540-546.

Bruckstein A M et al, "Down-scaling for better transform compression", IEEE Transactions on Image Processing, vol. 12, No. 9, Sep. 1, 2003, pp. 1132-1144.

Wang D et al, "Towards Optimal Rate Control: A Study of the Impact of Spatial Resolution, Frame Rate, and Quantization on Subjective Video Quality and Bit Rate", Visual Communications and Image Processing, 2003, in Proceedings of SPIE, vol. 5150, Jul. 8, 2003, pp. 198-209.

Herman et al, "Nonlinearity Modelling of QoE for Video Streaming over Wireless and Mobile Network", Intelligent Systems, Modelling and Simulation (ISMS), 2011 Second International Conference on, IEEE, Jan. 25, 2011, pp. 313-317.

* cited by examiner

| smax | zV, % | | | | | | | | | |
|---|---|---|---|---|---|---|---|---|---|---|
| | 10 | 20 | 30 | 40 | 50 | 60 | 70 | 80 | 90 | 100 |
| 0.1 | 79.1 | 59.6 | 30.1 | 17.5 | 13.7 | 14.1 | 14.1 | 14.1 | 14.1 | 14.1 |
| 0.2 | 89.9 | 79.6 | 68.8 | 53.0 | 34.3 | 28.4 | 22.5 | 22.5 | 22.5 | 22.5 |
| 0.3 | 90.0 | 88.7 | 79.8 | 69.7 | 59.1 | 45.8 | 39.1 | 32.8 | 32.8 | 32.8 |
| 0.4 | 90.0 | 89.9 | 80.0 | 79.8 | 69.9 | 59.6 | 51.5 | 48.8 | 41.4 | 39.9 |
| 0.5 | 90.0 | 90.0 | 86.5 | 80.0 | 79.4 | 69.8 | 62.3 | 59.7 | 49.5 | 40.0 |
| 0.6 | 90.0 | 90.0 | 89.2 | 80.0 | 80.0 | 76.1 | 69.7 | 69.7 | 59.7 | 49.7 |
| 0.7 | 90.0 | 90.0 | 89.9 | 83.8 | 80.0 | 79.9 | 79.8 | 70.0 | 69.3 | 59.7 |
| 0.8 | 90.0 | 90.0 | 90.0 | 86.9 | 80.0 | 80.0 | 80.0 | 78.6 | 70.0 | 60.0 |
| 0.9 | 90.0 | 90.0 | 90.0 | 88.8 | 82.1 | 80.0 | 80.0 | 79.9 | 70.0 | 60.0 |
| 1.0 | 90.0 | 90.0 | 90.0 | 89.5 | 84.0 | 80.0 | 80.0 | 80.0 | 79.1 | 80.0 |

| smax | 10 | 20 | 30 | 40 | 50 | 60 | 70 | 80 | 90 | 100 |
|---|---|---|---|---|---|---|---|---|---|---|
| 0.1 | 10 | 20 | 28 | 32 | 33 | 33 | 33 | 33 | 33 | 33 |
| 0.2 | 10 | 20 | 30 | 40 | 48 | 50 | 52 | 52 | 52 | 52 |
| 0.3 | 10 | 20 | 30 | 40 | 50 | 59 | 60 | 63 | 63 | 67 |
| 0.4 | 10 | 20 | 30 | 40 | 50 | 60 | 69 | 70 | 71 | 76 |
| 0.5 | 10 | 20 | 30 | 40 | 50 | 60 | 70 | 70 | 79 | 88 |
| 0.6 | 10 | 20 | 30 | 40 | 50 | 60 | 70 | 70 | 80 | 90 |
| 0.7 | 10 | 20 | 30 | 40 | 50 | 60 | 60 | 79 | 80 | 90 |
| 0.8 | 10 | 20 | 30 | 40 | 50 | 60 | 69 | 71 | 80 | 90 |
| 0.9 | 10 | 20 | 30 | 40 | 50 | 60 | 70 | 70 | 80 | 100 |
| 1.0 | 10 | 20 | 30 | 40 | 50 | 60 | 70 | 79 | 80 | 100 |

Figure 13 zV, %

| smax | 10 | 20 | 30 | 40 | 50 | 60 | 70 | 80 | 90 | 100 |
|------|------|------|------|------|------|------|------|------|------|------|
| 0.1 | 0.23 | 0.33 | 0.35 | 0.36 | 0.38 | 0.37 | 0.37 | 0.37 | 0.37 | 0.37 |
| 0.2 | 0.25 | 0.41 | 0.52 | 0.56 | 0.56 | 0.60 | 0.56 | 0.57 | 0.57 | 0.57 |
| 0.3 | 0.25 | 0.44 | 0.55 | 0.63 | 0.67 | 0.68 | 0.69 | 0.68 | 0.68 | 0.67 |
| 0.4 | 0.25 | 0.46 | 0.56 | 0.66 | 0.70 | 0.73 | 0.73 | 0.75 | 0.74 | 0.75 |
| 0.5 | 0.25 | 0.46 | 0.58 | 0.66 | 0.74 | 0.76 | 0.77 | 0.79 | 0.79 | 0.80 |
| 0.6 | 0.25 | 0.46 | 0.61 | 0.67 | 0.75 | 0.78 | 0.80 | 0.81 | 0.82 | 0.84 |
| 0.7 | 0.25 | 0.46 | 0.62 | 0.68 | 0.75 | 0.80 | 0.82 | 0.84 | 0.84 | 0.86 |
| 0.8 | 0.25 | 0.46 | 0.62 | 0.70 | 0.75 | 0.81 | 0.84 | 0.85 | 0.86 | 0.89 |
| 0.9 | 0.25 | 0.46 | 0.62 | 0.72 | 0.76 | 0.81 | 0.85 | 0.86 | 0.87 | 0.94 |
| 1.0 | 0.25 | 0.46 | 0.62 | 0.73 | 0.77 | 0.81 | 0.85 | 0.88 | 0.88 | 0.99 |

*Figure 14*

METHOD AND SYSTEM FOR LOW COMPLEXITY TRANSCODING OF IMAGES WITH NEAR OPTIMAL QUALITY

FIELD OF THE INVENTION

The invention relates to the field of image transcoding, and in particular, to a method and system for low complexity transcoding of images with near optimal quality.

BACKGROUND OF THE INVENTION

Multimedia containing various content types including text, audio and video, provides an outstanding business and revenue opportunity for network operators. The availability of higher bandwidth and the use of packet-switched Internet Protocol (IP) technology have made it possible to transmit richer content that include various combinations of text, voice, still and animated graphics, photos, video clips, and music. In order to capitalize on this market potential network operators must meet customers' expectations regarding quality and reliability. Transcoding of media at server level is crucial for rendering multimedia applications in today's heterogeneous networks composed of mobile terminals, cell phones, computers and other electronic devices. The adaptation and transcoding of media must be performed at the service provider level because individual devices are often resource constrained and are rarely capable of adapting the media themselves. This is an important problem for service providers, as they will have to face a very steep traffic growth in the next few years; growth that far exceeds the speed up one can obtain from new hardware alone.

Multimedia Messaging Services, for example, provide server-side adaptation to ensure interoperability between terminals. Adaptations required for multimedia messaging are discussed by S. Coulombe and G. Grassel, in "Multimedia adaptation for the multimedia messaging service," published in IEEE Communications Magazine, volume 42, number 7, pages 120-126, July 2004. The most frequent image-related interoperability issues do not involve image formats, as the majority of the traffic involves JPEG and GIF images, but rather a resolution or file size exceeding the capabilities of the receiving terminal. For instance, the limited memory of some mobile phones requires images to be under a certain size or resolution in order to be received and displayed. Moreover, the height and the width of the image should be such that it can be accommodated by the terminal with a given set of characteristics. Changing an image's resolution, or scaling, to meet a terminal's capabilities is a problem with well-known solutions. However, optimizing image quality against terminal constraints remains a challenge, as there are no well-established relationships between the quality factor (QF) used in JPEG (or the number of colors used in GIF), perceived quality, and the compressed file size. Using scaling as an additional means of achieving file size reduction, rather than merely resolution adaptation, makes the problem all the more challenging. Several studies have investigated the problem of file size (or bit rate) reduction for visual content. Examples include the paper by Z. Lei and N. D. Georganas, entitled "Accurate bit allocation and rate control for DCT domain video transcoding," in Proceedings of the IEEE CCECE 2002, Canadian Conference on Electrical and Computer Engineering, 2002, volume 2, pages 968-973, the paper by J. Ridge entitled "Efficient transform-domain size and resolution reduction of images," published in Signal Processing: Image Communication, volume 18, number 8, pages 621-639, September 2003 and the US patent by V. Ratnakar and V. Ivashin, entitled "File size bounded JPEG transcoder," May 2001, U.S. Pat. No. 6,233,359. The results of these studies show that reduction can be achieved through adaptation of quantization parameters, rather than through scaling. For most studies, this makes sense, since they were carried out in the context of low bit rate video, where resolution is often limited to a number of predefined formats. However, even in the context of still-picture coding, scaling as an adaptation strategy is not considered. For instance, Ridge provides excellent methods for scaling and then reducing the file size of JPEG images but does not consider estimating scaling and quality reduction in combination. This seems to be a major shortcoming, because the best strategy for maximizing user experience may well be to scale down the picture and compress it with a higher QF, rather than simply re-compressing it with a lower QF. Applicants Steven Pigeon and Stephane Coulombe have presented methods to estimate the compressed file size of a JPEG image subject to scaling and QF changes in "Computationally efficient algorithms for predicting the file size of JPEG images subject to changes of quality factor and scaling" published in Proceedings of the 24th Queen's Biennial Symposium on Communications, Queen's University, Kingston, Canada, 2008. It is noted that several combinations of QF and scaling lead to the same approximate file size, raising the question of which combination would maximize user experience, or image quality.

Before discussing how the present invention addresses the issues discussed earlier, a brief description of a typical prior art transcoding environment is presented. JPEG is a popular technique for compressing images contained in MMS messages. The JPEG standard provides a commonly used method for image compression. As is well known, JPEG compression is "lossy", that is a compressed image may not contain 100% of the digital information contained in the original image. The loss of information can be controlled by setting the quality factor during the compression. A lower quality factor is equivalent to higher compression and generally leads to a smaller image file size. Conversely, a higher quality factor leads to a larger image file size, and generally higher perceived "quality" of the image.

By way of example, FIG. 1 illustrates a multi-media messaging (MMS) system architecture 100, including an Originating Node 102, a Service Delivery Platform 104, a Destination Node 106, and an Adaptation Engine 108. The Originating Node 102 is able to communicate with the Service Delivery Platform 104 over a Network "A" 110. Similarly the Destination Node 106 is able to communicate with the Service Delivery Platform 104 over a Network "B" 112. The Networks "A" and "B" are merely examples, shown to illustrate a possible set of connectivities, and many other configurations are also possible. For example, the Originating and Destination Nodes (102 and 106) may be able to communicate with the Service Delivery Platform 104 over a single network; the Originating Node 102 may be directly connected to the Service Delivery Platform 104 without an intervening network, etc.

The Adaptation Engine 108 may be directly connected with the Service Delivery Platform 104 over a link 114 as shown in FIG. 1, or alternatively may be connected to it through a network, or may be embedded in the Service Delivery Platform 104.

In a simple case, the Originating Node 102 may send a (multimedia) message that is destined for the Destination Node 106. The message is forwarded through Network "A" 110 to the Service Delivery Platform 104 from which the message is sent to the Destination Node 106 via Network "B" 112. The Originating and Destination Nodes (102 and 106)

may for instance be wireless devices, the Networks "A" and "B" (110 and 112) may in this case be wireless networks, and the Service Delivery Platform 104 may provide the multimedia message forwarding service.

In another instance, the Originating Node 102 may be a server of a content provider, connected to the Service Delivery Platform 104 through a data network. Thus, Network "A" 110 may be the internet, while Network "B" 112 may be a wireless network serving the Destination Node 106 which may be a wireless device.

An overview of server-side adaptation for the Multimedia Messaging Service (MMS) is given in a paper "Multimedia Adaptation for the Multimedia Messaging Service" by Stephane Coulombe and Guido Grassel, IEEE Communications Magazine, volume 42, number 7, pages 120-126, July 2004.

In the case of images in particular, the message sent by the Originating Node 102 may include an image, specifically a JPEG encoded image. The capabilities of the Destination Node 106 may not include the ability to display the image in its original form, for example because the height or width of the image in terms of the number of pixels, that is the resolution of the image, exceeds the size or resolution of the display device or terminal in the Destination Node 106. In order for the Destination Node 106 to receive and display it, the image may be modified in an Image Transcoder 116 in the Adaptation Engine 108 before being delivered to the Destination Node 106. The modification of the image by the Image Transcoder 116 typically may include scaling, i.e. change the image resolution, and compression.

Thus, there is a need in the industry for an improved method and system for transcoding images that address the limitations of the prior art discussed earlier and take image quality and speed of transcoding into account.

SUMMARY OF THE INVENTION

Therefore there is an object of the present invention to provide an improved method and system for low complexity transcoding of images with near optimal quality, e.g., transcoding of images contained in MMS messages.

A method for transcoding of an input image into an output image for display on a terminal, comprising steps of: (a1) prior to the transcoding, generating a data-set, comprising transcoding parameters generated by performing an optimal quality transcoding of a set of training images in a training image set T to produce a highest quality transcoded training image for each training image, while satisfying the characteristics of the terminal; (b1) extracting features of the input image and obtaining characteristics of the terminal; (c1) selecting the transcoding parameters from the data-set generated in the step (a1) by using the characteristics of the terminal and the features of the input image extracted in the step (b1); and (d1) transcoding the input image into the output image by using the transcoding parameters selected in the step (c1). The step (a1) comprises generating a data-set, comprising transcoding parameters corresponding to combinations of characteristics of the terminal and features of the input image. The step (b1) comprises extracting the features of the input image, including a quality factor QF(I) characterizing fidelity of encoding for the input image, an image file size S(I), an image width W(I), and an image height H(I). The step (c1) of selecting the transcoding parameters comprises selecting a transcoding quality factor QFT characterizing fidelity of encoding for the output image, and a transcoding scaling factor zT characterizing a change in image resolution due to the transcoding. The data-set generated in the step (a1) includes N multi-dimensional matrices, including one or more of the following: a first matrix storing an average optimal quality factor QFA for one or more subsets of the training images from the training image set T, each QFA being determined as an average of the QFT used during the optimal quality transcoding of the training images in a respective subset of the training images; a second matrix storing an average optimal-scaling factor zA for one or more subsets of the training images, each zA being determined as an average of the zT used during the optimal quality transcoding of the training images in a respective subset of the training images; and a third matrix storing an average image quality metric QA for one or more subsets of the training images, each QA being determined as an average of quality metrics, indicating a degree of similarity between the training images and respective highest quality transcoded training images generated during the optimal quality transcoding, for a respective subset of the training images. Each matrix is indexed by two or more of the following indices: a first index, indicating the quality factor QF(I) of the input image; a second index, indicating a viewing scaling factor zV characterizing a change in image resolution due to viewing conditions for the output image; and a third index, indicating a maximum relative image size "smax" characterizing relative size of the output image with respect to the input image. The step (a1) further comprises: (a7) selecting a combination of the QF(I), the zV and the "smax"; (a7-i) for the selected combination of the zV and the "smax", generating the average optimal quality factor QFA and the average optimal scaling factor zA using a subset of the training images whose quality factor equals QF(I); (a7-ii) storing the QFA in the first matrix, and the zA in the second matrix, in positions indexed by the selected combination of the QF(I), the zV and the "smax"; and (a7-iii) varying the QF(I), the zV and the "smax" in predetermined intervals, and repeating the steps between (a7) and (a7-iii), including the step (a7), until all combinations of the QF(I), the zV and the "smax" have been used. The method comprising: (a8-i) for the selected combination of the zV and the "smax", generating the average image quality metric QA using a subset of the training images whose quality factor equals QF(I), including determining the quality metric for the highest quality transcoded training image for each training image in the subset of the training images; and (a-8ii) storing the QA in the third matrix in a position indexed by the selected combination of the QF(I), the zV and the "smax"; the steps (a8-i) and (a8-ii) being performed after the step (a7) and before the step (a7-iii). The step (a7-i) further comprises: (a9) for each training image in the subset of the training images, determining the transcoding quality factor QFT and the transcoding scaling factor zT that produce the highest quality transcoded training image; and (b9) determining the average optimal quality factor QFA and the average optimal scaling factor zA using the transcoding quality factors QFT and the transcoding scaling factors zT for the training images determined in the step (a9). The step (a9) further comprises: (a10) selecting the transcoding parameters, comprising a combination of the transcoding quality factor QFT, and the transcoding scaling factor zT; (a10-i) for the selected combination of the QFT and the zT, transcoding the training image to produce the transcoded training image; (a10-ii) determining a quality metric for the transcoded training image generated in the step (a10-i), indicating a degree of similarity between the training image and the transcoded training image; (a10-iii) varying the QFT and the zT in predetermined intervals, and repeating the steps between (a10) to (a10-iii), including the step (a10), until all combinations of the QFT, and the zT have been used; and (a10-iv) selecting the QFT and the zT that produced the highest quality metric in the step (a10-ii). The step a-10(i) further comprises: (a11) decompressing and scaling the training image by applying the selected scaling factor zT; and (b11) compressing the decompressed and scaled training image produced in the step (a11) by applying the selected quality factor QFT. The step (a-10ii) further comprises: (12a) decompressing and scaling the transcoded training image by applying a re-scaling factor zR, for producing an image J'; (12b) decompressing and scaling the transcoded training image by applying the viewing scaling factor zV for producing an image L'; and (12c) generating the quality metric indicating the degree of similarity between the training image and the transcoded training image by using the images J' and L' respectively. The zR equals zV/zT. The step 12(c) comprises determining a Structural SIMilarity (SSIM) index, by using the image J' and the image L'. The step (a8-i) further comprises: (a15) retrieving the average optimal quality factor QFA stored in the first matrix and the average optimal scaling factor zA stored in the second matrix; (a15-i) transcoding the training image using the QFA and the zA retrieved in the step (a15) to produce the transcoded training image; (a15-ii) determining whether the transcoded training image satisfies the characteristics of the terminal; (a15-iii) repeating the steps between (a15) to (a15-iii), including the step (a15), with next smaller value of the "smax" available in the first and the second matrices until the transcoded training image satisfies the characteristics of the terminal; and (b15) determining the quality metric of the transcoded training image generated in step (a15-i) that satisfies the characteristics of the terminal. The step (a15-ii) comprises determining whether an image file size of the transcoded training image is lower or equal to a maximum image file size S(D) supported by the terminal. The step (d1) further comprises: (a17) determining the zV and the "smax" using the features of the input image, QF(I), S(I), W(I) and H(I) extracted in the step (b1) and the characteristics of the terminal; (b17) retrieving the average optimal quality factor QFA stored in the first matrix, and the average optimal scaling factor ZA stored in the second matrix indexed by the QF(I) retrieved in the step (b1), and the zV and the "smax" determined in the step (a17); (b17-i) transcoding the input image using the QFA and the zA retrieved in the step (b17) as the transcoding quality factor QFT and the transcoding scaling factor zT respectively, to produce the output image; (b17-ii) checking whether the output image satisfies the characteristics of the terminal; and (b17-iii) repeating the steps between (b17) to (b17-iii), including the step (b17), with next smaller values of the "smax" available in the first and the second matrices until the output image satisfies the characteristics of the terminal; and (c17) retrieving the average image quality QA stored in the third matrix in a position indexed by the QF(I), the smax and the zV corresponding to the output image generated in the step (b17-i) that satisfies the characteristics of the terminal. The characteristics of the terminal comprise the maximum image file size S(D), a terminal width W(D) and a terminal height H(D), the step (a17) further comprises selecting a transcoding quality factor QFT characterizing fidelity of encoding for the output image, and a transcoding scaling factor zT characterizing a change in image, comprising: (a18) setting the zV to a minimum of (W(D)/W(I)), (H(D)/H(I)) and 1; and (b18) setting the "smax" to a minimum of (S(D)/S(I)) and 1. The step (a1) further comprises: (a19) selecting the transcoding parameters, comprising a combination of the transcoding quality factor QFT, and the transcoding scaling factor zT; (a19-i) for the selected combination of the QFT and the zT, transcoding the training image to produce the transcoded training image; (a19-ii) determining a quality metric for the transcoded training image generated in the step (a19-i), indicating a degree of similarity between the training image and the transcoded training image; (a19-iii) varying the QFT and the zT in predetermined intervals, and repeating the steps between (a19) to (a19-ii), including the step (a19), until all combinations of the QFT, and the zT have been used; and (a19-iv) selecting the QFT and the zT that produced the highest quality metric in the step (a19-ii). The step a-19(i) further comprises: (a20) decompressing and scaling the training image by applying the selected scaling factor zT; and (b20) compressing the decompressed and scaled training image produced in the step (a20) by applying the selected quality factor QFT. The step (a-19ii) further comprises: (a21) decompressing and scaling the transcoded training image by applying a re-scaling factor zR, for producing an image J'; (b21) decompressing and scaling the transcoded training image by applying a viewing scaling factor zV characterizing a change in image resolution due to viewing conditions for the output image, for producing an image L'; and (c21) generating the quality metric indicating the degree of similarity between the training image and the transcoded training image by using the images J' and L' respectively. The zR equals zV/zT. The step (c21) comprises determining a Structural SIMilarity (SSIM) index, by using the image J' and the image L'.

A system having a processor and a computer readable storage medium, for transcoding of an input image into an output image for display on a terminal, the system comprising: (a24) a Training Image Repository stored in the computer readable medium, comprising a training image set T including training images; (b24) an Off-Line Data-Set Generator comprising computer readable instructions stored in the computer readable storage medium, generating a data-set prior to the transcoding of the input image, the data-set comprising transcoding parameters generated by an optimal quality transcoding of a set of the training images from the training image set T, producing a highest quality transcoded training image for each training image, while satisfying characteristics of the terminal; (c24) a Data-Set Repository stored in a computer readable storage medium, storing the data-set produced by the Off-Line Data-Set Generator (b24); and (d24) an On-Line Transcoder, comprising computer readable instructions stored in a computer readable storage medium selecting the transcoding parameters from the data-set stored in the Data-Set Repository (c24), by using the characteristics of the terminal and the features of the input image, and transcoding the input image into the output image by using the selected transcoding parameters. The data-set comprises transcoding parameters corresponding to combinations of the characteristics of the terminal and features of the input image. The transcoding parameters include a transcoding quality factor QFT characterizing fidelity of encoding for the output image, and a transcoding scaling factor zT characterizing a change in image resolution due to the transcoding. The data-set includes N multi-dimensional matrices, including one or more of the following: a first matrix storing an average optimal quality factor QFA for one or more subsets of training images from the training image set T, each QFA being determined as an average of the QFT used during the optimal quality transcoding of training images in a respective subset of the training images; a second matrix storing an average optimal scaling factor zA for one or more subsets of training images, each zA being determined as an average of the zT used during the optimal quality transcoding of training images in a respective subset of the training images; and a third matrix storing an average image quality metric QA for one or more subsets of the training images, each QA being determined as an average of quality metrics, indicating degree of similarity between the training images and corresponding highest quality transcoded training images generated during the optimal quality transcoding, for a respective subset of training images. Each matrix is indexed by two or more of the following indices: a first index, indicating a quality factor QF(I) characterizing fidelity of encoding for the input image; a second index, indicating a viewing scaling factor zV characterizing a change in image resolution due to viewing conditions for the output image; and a third index, indicating a maximum relative image size "smax" characterizing relative size of the output image with respect to the input image. The Off-Line Data-Set Generator (b24) comprises: (a29) an Image Feature Extraction Unit, extracting features of a training image in the training image set T; (b29) a First Quality-Aware Parameter Selection Unit, selecting the QFT and the zT, and determining the average optimal quality factor QFA and the average optimal scaling factor zA by using the features extracted by the Image Feature Extraction Unit (a24); (c29) a Transcoding Unit, transcoding the training image into a transcoded training image by using the QFT and the zT selected by the First Quality-Aware Parameter Selection Unit (b29); and (d29) a Quality Assessment Unit, determining the quality metric for the transcoded training image generated by the Transcoding Unit (c-29), the quality metric indicating a degree of similarity between the training image and the transcoded training image. The First Quality-Aware Parameter Selection Unit (b29) further comprises a computational means for determining the average image quality metric QA. The Transcoding Unit (c29) comprises: (a31) a Decompression and Scaling Unit, producing a decompressed and scaled training image by applying the scaling factor zT to the training image; and (b31) a Compression unit, producing the transcoded training image by applying the transcoding quality factor QFT to the decompressed and scaled training image. The Quality Assessment Unit (d29) comprises: (a32) a Second Decompression and Scaling Unit, decompressing and scaling the transcoded training image by applying a re-scaling factor zR; (b32) a Third Decompression and Scaling Unit, decompressing and scaling the training image by applying the viewing scaling factor zV; and (c32) a Quality Metric Computation Unit, computing the quality metric for the transcoded training image. The Quality Metric Computation Unit (c32) comprises a computational means for determining a Structural SIMilarity (SSIM) index indicating similarity between the training image and the transcoded training image. The On-Line Transcoder (d24) comprises: (a34) an Image Feature Extraction Unit, extracting the features of the input image; (b34) an Optimal Parameter Prediction Unit, retrieving the average optimal quality factor QFA stored in the first matrix, and the average optimal scaling factor zA stored in the second matrix by using the features of the input image extracted by the Image Feature Extraction Unit (a34) and the characteristics of the terminal; (c34) a Second Quality-Aware Parameter Selection Unit, determining the transcoding quality factor QFT and the transcoding scaling factor zT by using the QFA and the zA retrieved by the Optimal Parameter Prediction Unit (b34)), and retrieving the average image quality QA stored in the third matrix; and (d34) a Transcoding Unit, transcoding the input image into the output image by using the QFT and the zT selected by the Second Quality-Aware Parameter Selection Unit (c34).

A computer readable storage medium, having a computer readable program code instructions stored thereon, when executed by a computer, to perform the steps of the method as described above.

A system having multiple computing nodes connected by a communication network, each node comprising a processor and a computer readable storage medium, for transcoding of an input image into an output image for display on a terminal, the system comprising: (a36) a Training Image Repository comprising a training image set T including training images stored in the computer readable storage medium of a first node; (b36) an Off-Line Data-Set Generator comprising computer readable instructions stored in a computer readable medium of a second node for generating a data-set prior to the transcoding of the input image, the data-set comprising transcoding parameters generated by an optimal quality transcoding of a set of the training images from the training image set T, producing a highest quality transcoded training image for each training image, while satisfying characteristics of the terminal; (c36) a Data-Set Repository, storing the data-set produced by the Off-Line Data-Set Generator (b36) in a computer readable storage medium of a third node; and (d36) an On-Line Transcoder comprising computer readable instructions stored in a computer readable medium of a fourth node, for selecting the transcoding parameters from the data-set stored in the Data-Set Repository (c36), by using the terminal characteristics and the features of the input image, and transcoding the input image into the output image by using the selected transcoding parameters.

The step (b1) in the method comprises extracting the features of the input image, including a number of colors for the input image, an image file size S(I), an image width W(I), and an image height H(I).

Thus, an improved system and method for low complexity transcoding of images with near optimal quality have been provided.

BRIEF DESCRIPTION OF THE DRAWINGS

Further features and advantages of the invention will be apparent from the following description of the embodiment, which is described by way of example only and with reference to the accompanying drawings, in which:

FIG. 12 presents a "slice" of the first matrix that corresponds to a QF(I) of 80 used for illustrating the method of the embodiment of the invention;

FIG. 13 presents a "slice" of the second matrix that corresponds to a QF(I) of 80 used for illustrating the method of the embodiment of the invention; and FIG. 14 presents a "slice" of the third matrix that corresponds to a QF(I) of 80 used for illustrating the method of the embodiment of the invention.

DETAILED DESCRIPTION OF THE EMBODIMENTS OF THE INVENTION

Figure 1:
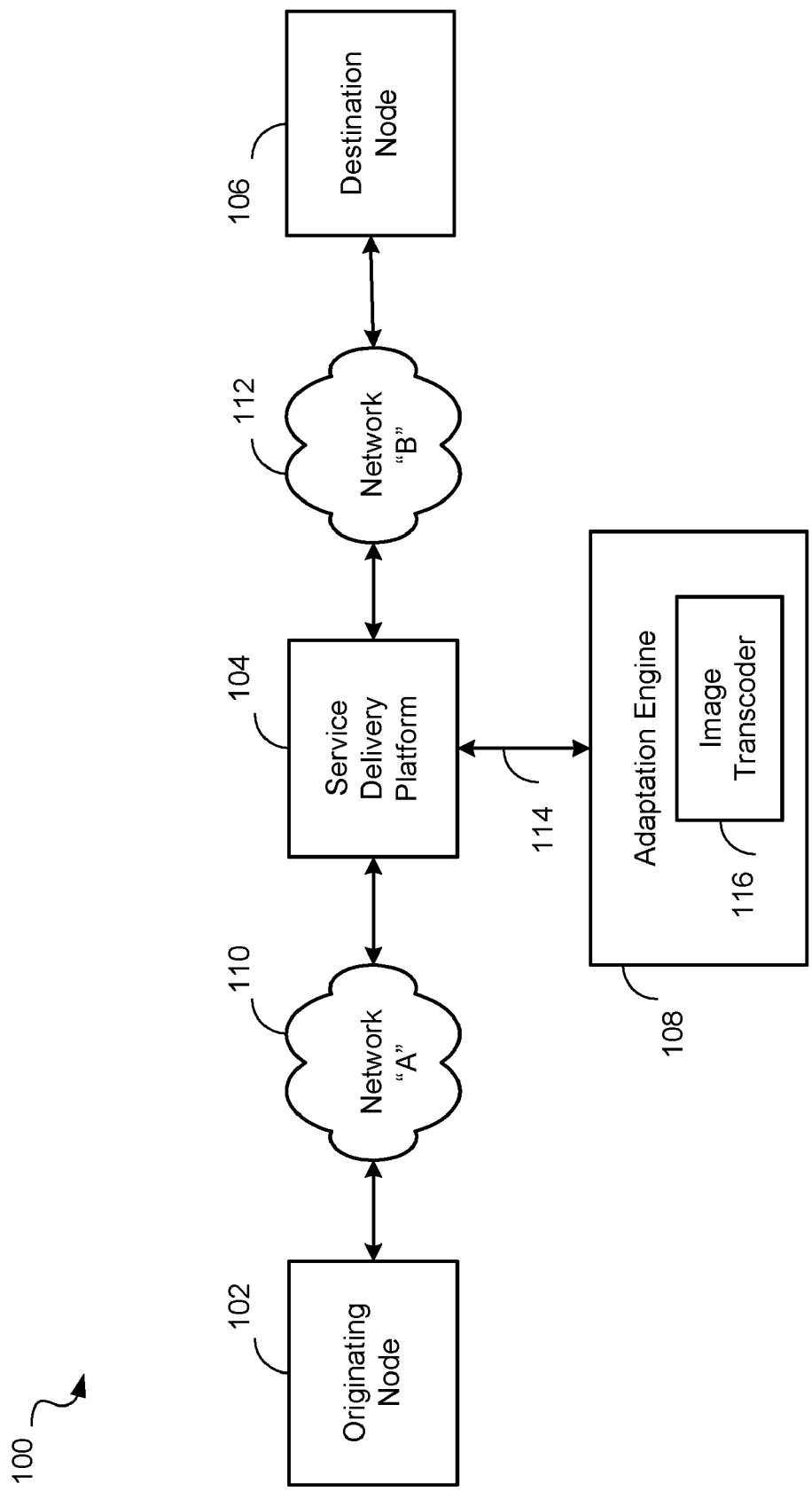
FIG. 1 presents an example of a Multimedia Messaging System architecture 100 of prior art.

The present invention focuses on combining the quality factor and scaling factors in JPEG transcoding to meet a resolution of a terminal and image file size constraints, while at the same time maximizing a quality metric. For convenience, a glossary of terms used in this application is provided below.

GLOSSARY OF TERMS

H(D) Terminal height

H(I) Image height for the input image

QA Average image quality metric for a subset of training images, determined as an average of the quality metrics, indicating a degree of similarity between the training images and respective highest quality transcoded training images generated during optimal quality transcoding of the training images in the subset of training images QFA Average optimal quality factor for a subset of training images, determined as an average of the transcoding quality factor (QFT) used during the optimal quality transcoding of the training images in the subset of the training images QF(I) Quality factor for the input image characterizing fidelity of encoding for the input image QFT Transcoding quality factor characterizing fidelity of encoding for the of the output image S(D) Maximum image file size S(D) supported by the terminal S(I) Image file size for the input image smax Maximum relative image size characterizing relative size of the output image with respect to the input image SSIM Structural Similarity index function used for comparing the similarity of two images T Image Training set W(D) Terminal width W(I) Image width for the input image zA Average optimal scaling factor for a subset of training images, determined as an average of the transcoding scaling factor (zT) used during the optimal quality transcoding of the training images in the subset of training images zT Transcoding scaling factor characterizing a change in image resolution due to transcoding of the input image into an output image zV Viewing scaling factor characterizing a change in image resolution due to viewing conditions for the output image zR Re-scaling factor, determined as the ratio of zV and zT We will introduce the notations used in this application in the context of the JPEG image transcoding problem. Let I be a JPEG compressed image and QF(I), S(I), W(I), and H(I) be its quality factor, image file size (after compression), image width, and image height respectively. Please note that we will assume that the QF complies with the definition of the Independent JPEG Group as described by T. Lane, P. Gladstone, L. Ortiz, J. Boucher, L. Crocker, J. Minguillon, G. Phillips, D. Rossi, and G. Weijers, in "The independent JPEG group software release 6b," 1998. The independent JPEG group (IJG) software and documentation are found at: http://www.ijg.org/ and http://www.ijg.org/files/. The IJG JPEG codec is a defacto standard implementation as it is used by most browsers and image viewers and is freely available.

The transcoded image is displayed on a terminal or device with a set of characteristics. The term terminal and device are used interchangeably in this application. For a terminal or device D, the characteristics include the maximum image file size S(D) supported by the terminal, the terminal width W(D), and terminal height H(D). Let $0 < z \leq 1$ be an aspect-preserving-scaling factor, or zoom factor. A JPEG transcoding operation, denoted $\tau$ (I,QFT, zT), is the function that returns the compressed image resulting from the application of both the transcoding quality factor QFT characterizing a fidelity of encoding for the transcoded image and the aggressiveness of compression and therefore file size, and the transcoding scaling factor zT, characterizing a change in image resolution due to transcoding, to the JPEG image I. The quality factor (on a scale of 0-100 in the Independent JPEG Group's library) controls the quantization steps used in the JPEG encoder and affects to what extent the resolution of each frequency component is reduced. A high quality factor leads to a high fidelity representation of the image in encoded form by using a good resolution (small quantization steps) for the frequency components. On the other hand, a low quality factor leads to a low fidelity representation of the image in encoded form by using a poor resolution (large quantization steps) for the frequency components; often discarding high frequency components altogether (image details). A larger quality factor with lead to a larger compressed file size. Therefore the quality factor controls the aggressiveness of compression and ultimately characterizes the expected fidelity of the reconstructed image.

A JPEG transcoding operation $\tau$ (I,QFT, zT) is defined as feasible on terminal D if, for image I, and transcoding parameters QFT, and zT, we meet all of the following constraints imposed by the terminal characteristics:

$$S(\tau(I,QFT,zT)) \leq S(D)$$

$$W(\tau(I,QFT,zT)) \leq W(D)$$

$$H(\tau(I,QFT,zT)) \leq H(D)$$

Please note that S(X), W(X) and H(X) refer to the image size, image height and image width respectively for the transcoded image produced by the function $\tau$.

Figure 2:
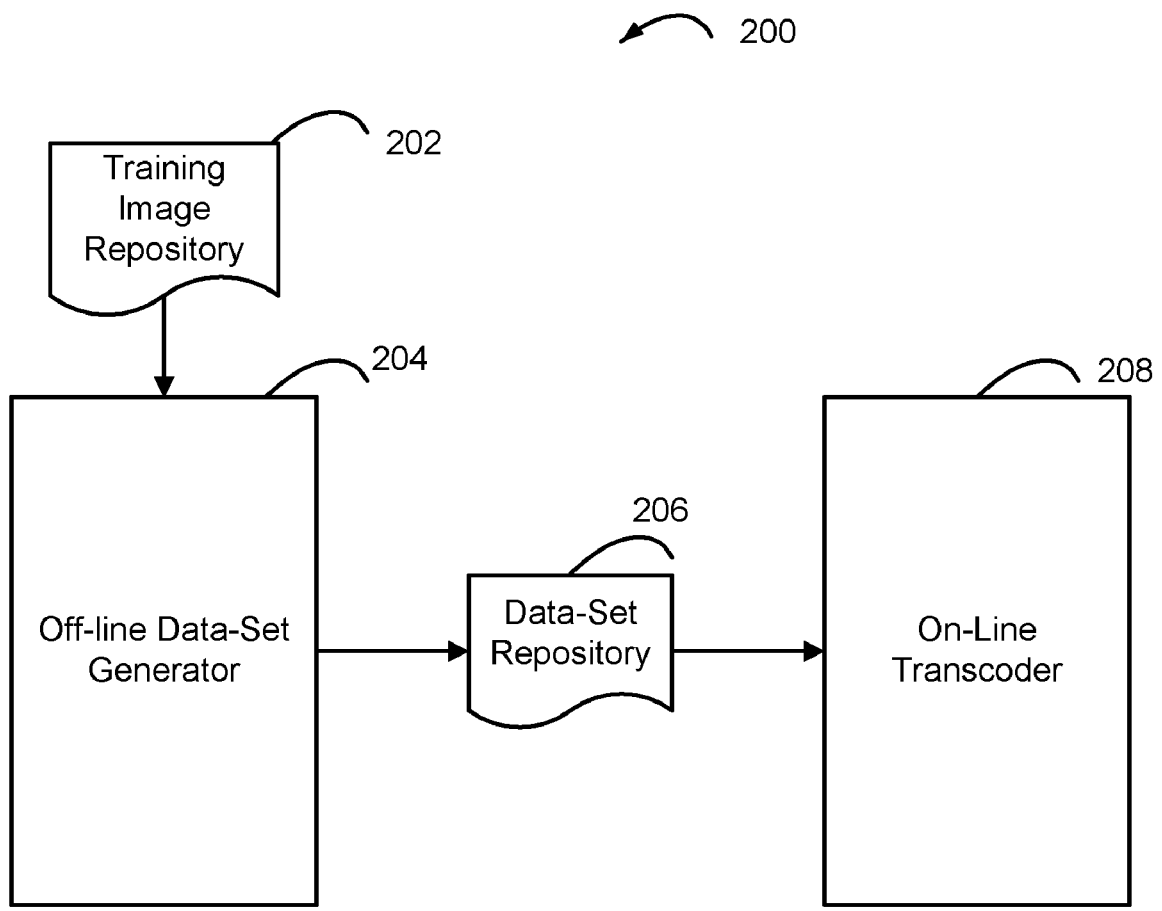
FIG. 2 illustrates a system 200 for transcoding of an input image into an output image for display on a terminal according to the embodiment of the invention.

A system 200 for transcoding of an input image into an output image for display on a terminal is displayed in FIG. 2. The system 200 comprises a Training Image Repository 202, an Off-Line Data-Set Generator 204, a Data-Set Repository 206 and an On-Line Transcoder 208. Prior to performing the transcoding of the multimedia images, the Off-line Data-Set Generator 204 uses a training image set T stored in the Training Image Repository 202 and produces a data-set stored in a Data-Set Repository 206. T includes numerous exemplars of images that are used to generate the transcoding parameters and predicted image quality that are included in the data-set. The Off-Line Data-Set Generator 204 and the Training Image Repository 202 are used only to determine the data-set. Once the data-set is produced only the On-Line Transcoder 208 is used for processing the MMS messages. The On-line Transcoder 208 uses the data-set stored in the Data-Set Repository 206, the characteristics of the terminal and the features of the input image to select the transcoding parameters to be used in transcoding of the images in the MMS messages.

The system of the embodiments of the invention can include a general purpose or specialized computer having a CPU and a computer readable medium, e.g., memory, or alternatively, the system can be implemented in firmware, or combination of firmware and a specialized computer (e.g. firmware for a specialized computer). Each of the Training Image Repository 202 and the Data-Set Repository 206 is stored in a computer readable storage medium. The Off-Line Data-Set Generator 204 and the On-Line Transcoder 208 comprise computer readable instructions stored in a computer readable storage medium.

Figure 3:
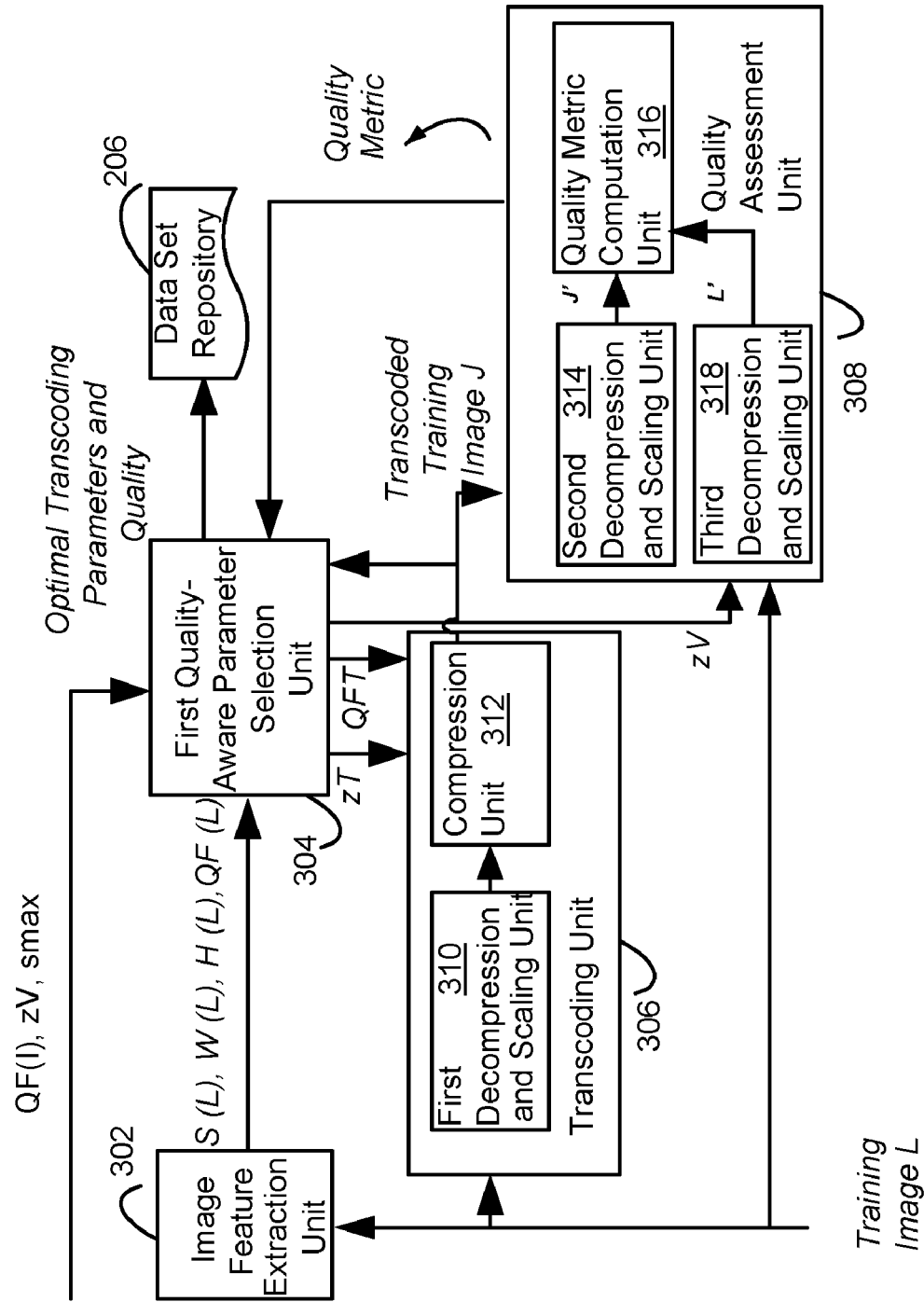
FIG. 3 displays functional components of the Off-line Data-Set Generator 204 of FIG. 2.
Figure 4:
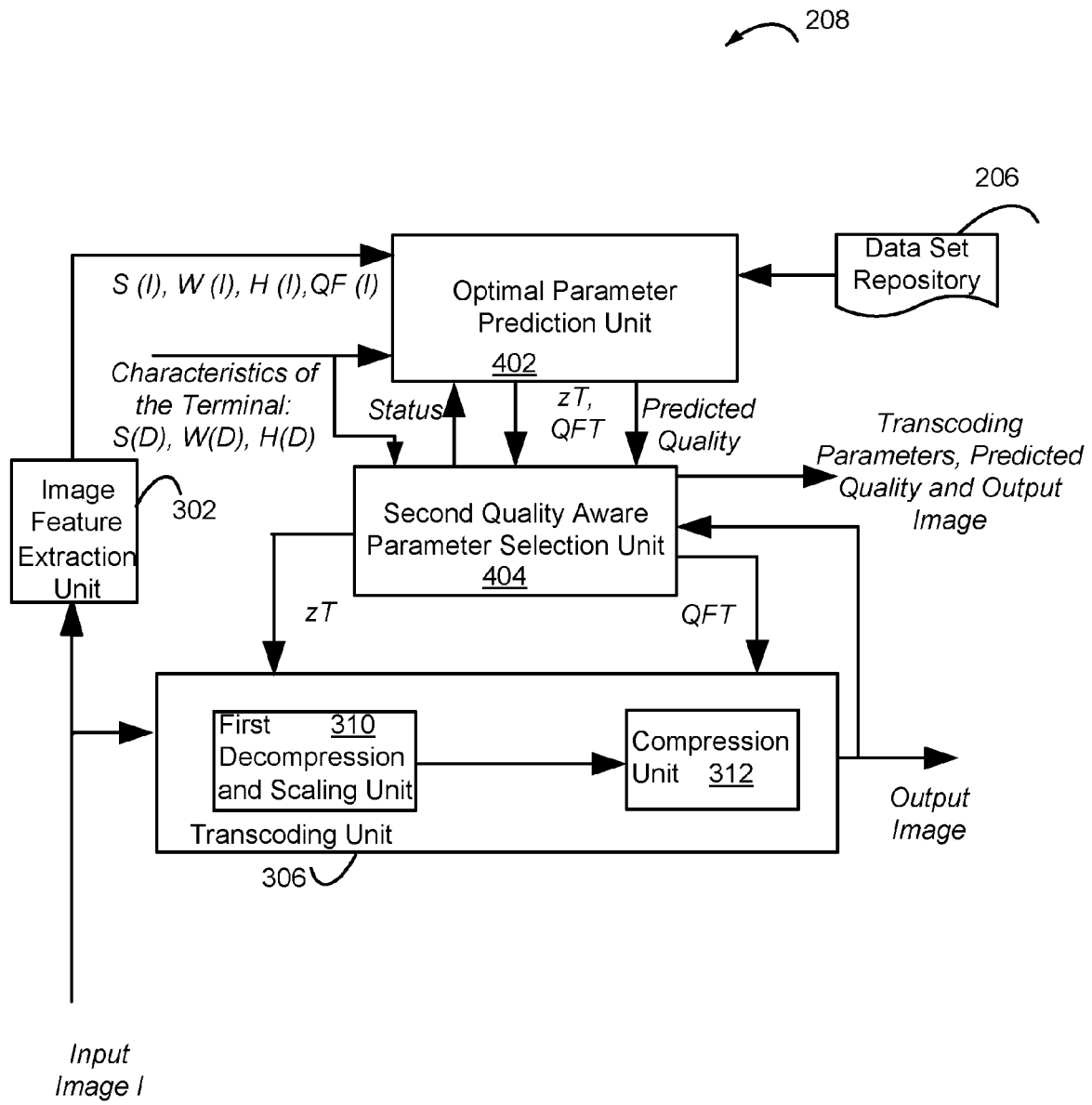
FIG. 4 displays functional components of the On-line Transcoder 208 of FIG. 2.

FIG. 3 illustrates functional components of the Off-line Data-Set Generator 204, and FIG. 4 illustrates functional components of the On-Line Transcoder 208. These functional components include units comprising a firmware, or alternatively, a computer software code stored in a computer readable storage medium. These computer readable media, storing instructions thereon for performing the steps of the methods of the embodiments of the invention, and forming the functional components of the system 200 may comprise computer memory, DVD, CD-ROM, floppy or the like. Alternatively, the system may have a plurality of computing nodes connected by a communication network, each node comprising a processor and a computer readable storage medium, for transcoding of an input image into an output image for display on a terminal as will be described in detail below.

The Off-line Data-Set Generator 204 presented in FIG. 3 comprises computer readable instructions that are stored in the computer readable storage medium and are executed by a processor. The Off-line Data-Set Generator 204 includes an Image Feature Extraction Unit 302, a First Quality-Aware Parameter Selection unit 304, a Transcoding Unit 306 and a Quality Assessment Unit 308. The Image Feature Extraction Unit 302 obtains the training image L and extracts its features that include a quality factor QF(L) characaterizing fidelity of encoding for the training image, an image file size S(L), an image width W(L), and an image height H(L) that are provided to the First Quality-Aware Parameter Selection Unit 304. Please note that S(L) is the file size obtained after the compression performed during the encoding of the training image and will be referred to as the image file size. In addition to the features of the training image L, the First Quality-Aware Parameter Selection Unit 304 uses the parameters QF(I), smax and zV and a quality metric computed by the Quality Assessment Unit 308 as well as the transcoded training image produced by the Transcoding Unit 306. zV is a viewing scaling factor characterizing a change in image resolution due to viewing conditions for the output image whereas smax characterizes the relative size of an image obtained after transcoding. Further discussion of these parameters including the computation of smax is provided later in this document. The First Quality-Aware Parameter Selection Unit 304 determines the set of optimal transcoding parameters corresponding to the given terminal characteristics and the features of the training image L. The optimal transcoding parameters include the quality factor and the scaling factor that correspond to optimal quality transcoding producing the highest quality transcoded training image for then training image L. The First Quality-Aware Parameter Selection Unit 304 also determines the quality metric for this highest quality transcoded image. By using these optimal transcoding parameters and the quality metric for a given subset of training images in the training image set T, average optimal parameter values that include the average optimal quality factor QFA and the average optimal scaling factor zA and the average image quality metric QA for the subset can be computed. Such a subset of training images may correspond to training images with a given quality factor for example. The First Quality-Aware Parameter Selection Unit 304 comprises a procedure or function including computer readable instructions that execute on a processor providing the computational means for determining the average image quality metric QA and the average optimal transcoding parameters. The First Quality-Aware Parameter Selection Unit 304 uses an iterative method (discussed in detail later) that selects the transcoding quality factor QFT and the transcoding scaling factor zT for each iteration. The zT and QFT from the First Quality-Aware Parameter Selection Unit 304 are used by the Transcoding Unit 306 to process the input training image L. The Transcoding Unit 306, in turn, includes a First Decompression and Scaling Unit 310 and a Compression Unit 312. The First Decompression and Scaling Unit 310 receives the training image L as input and applies the zT produced by the First Quality-Aware Parameter Selection Unit 304 for performing decompression and scaling of the training image L. The output of the First Decompression and Scaling Unit 310 is used by the Compression Unit 312 that applies the transcoding quality factor QFT generated by the First Quality-Aware Parameter Selection Unit 304 to produce the transcoded training image J that is presented to the input of the Quality Assessment Unit 308. The Quality assessment Unit 308 comprises a Second Decompression and Scaling Unit 314 and a Third Decompression and Scaling Unit 318 as well as a Quality Metric Computation Unit 316. Both the transcoded training image J that is the output of the Transcoding Unit 306 as well as the training image L are scaled prior to quality evaluation. We define the quality metric comparing the training image L and, its transcoded version, the transcoded training image J (transcoded using transcoding scaling factor zT) for a viewing scaling factor zV characterizing a change in image resolution due to viewing conditions for the output image as:

$$QzV(L,J)=SSIM(R(L,zV),R(J,zV/zT))$$

where SSIM is the Structural Similarity index used for comparing the similarity of two images and is defined, for example, by Zhou Wang, Alan Conrad Bovik, Hamid Rahim Sheikh and Eero P. Simoncelli, in "Image quality assessment: from error visibility to structural similarity," published in IEEE Transactions on Image Processing, volume 13, number 4, pages 600-612, April, 2004. R(I, z) is an operator which decompresses I and scales it using the scaling factor z. According to this definition and FIG. 3, for the image resolutions to be equal, the following equation should be satisfied:

$$zV=zT*zR$$

where $zV \leq 1$, since we do not want to increase the original image's resolution when comparing quality, and where $zT \leq 1$ is necessary to meet the constraints imposed by the characteristics of the terminal. The viewing conditions for the output image controlled by the viewing scaling factor zV ($zT \leq zV \leq 1$) play a noticeable role in users' perception of the results of the transcoding operation. For example, when zV=1, we compare the images at the resolution of the original input training image L and, $$zR=1/zT$$

When zT<zV<1, we compare images at a resolution between the original training image and the transcoded training image J's resolutions. The Quality Metric Computation Unit 316 comprises a procedure or function including computer readable instructions that execute on a processor, thus providing computational means for determining the SSIM index. The Second Decompression and Scaling Unit 314 scales the transcoded training image J by using the scaling factor zR to produce an image J'. where as the Third Decompression and Scaling Unit 318 scales the input training image L by using the viewing scaling factor zV to produce an image L'. The quality metric computation unit 316 takes the images J' and L' and determines the SSIM index using these two images to produce the quality metric QzV (L', J') that is presented to the Quality-Aware Parameter Selection Unit 304.

Each of the functional components, the Training Image Repository 202 used by the Off-Line Data-Set Generator 204 and the Data-Set Repository 206 used by both the Off-Line Data-Set Generator 204 and the On-Line Transcoder 208 includes computer storage medium, e.g. memory, disk, DVD, CD-ROM, floppy and the like. Alternatively, the Training Image Repository 202 and the Data-Set Repository 206 may include an independent computer equipped with a processor executing instructions stored in a computer readable medium, and a computer storage medium, that is connected to the other system components (as shown in FIG. 2) through an interface. Such a connection may be local or may span the Internet with the computer for the Training Image Repository 202 or the Data-Set repository 206 being at a remote location.

The On-line Transcoder 208 displayed in FIG. 4 comprises computer readable instructions that are stored in the computer readable medium and executed by a processor. The On-line Transcoder 208 includes an Image Feature Extraction Unit 302, an Optimal Parameter Prediction Unit 402, a Second Quality-Aware Parameter Selection Unit 404 and a Transcoding Unit 306. The Image Feature Extraction Unit 302 and the Transcoding Unit 306 are exactly the same as those used in the Off-Line Data-Set Generator 204. The only difference is that we are now concerned with the transcoding of an input image from a MMS message as opposed to the transcoding of training images that were used in the context of the Off-Line Data Generator 204. The Image Feature Extraction Unit 302 extracts the features of the input image I that is to be transcoded and passes the extracted features onto the Optimal Parameter Prediction Unit 402 and the Second Quality-Aware Parameter Selection Unit 404. These features include a quality factor QF(I) characterizing fidelity of encoding for the input image, an image file size S(I), an image width W(I), and an image height H(I). Using the features of the input image the Optimal Parameter Prediction Unit 402 retrieves the average optimal transcoding parameters from the data-set stored in the Data-Set Repository 206 and passes these to the Second Quality-Aware Parameter Selection Unit 404. The transcoding of the image is an iterative process that stops when the transcoded image satisfies the constraints imposed by the terminal characteristics. The Optimal Parameter prediction Unit 402, the Second Quality-Aware Parameter Selection Unit 404 and the Transcoding Unit 306 cooperate with each other in this iterative process. The Second Quality-Aware Parameter Selection Unit 404 is responsible for generating the transcoding parameters that are used by the Transcoding Unit 306. The Second Quality-Aware Parameter Selection Unit 404 uses the information retrieved by the Optimal Parameter Prediction Unit 402 and the characteristics of the transcoded image produced by the Transcoding Unit 306. The parameter values obtained from the Optimal Parameter prediction Unit 402 are passed onto the Transcoding Unit 306 that performs the transcoding operation. The transcoded image is forwarded to the Second Quality-Aware Parameter Selection Unit 404 that checks the size of the output image to decide whether or not the iteration should stop. It passes on this decision regarding the "status" of the iteration to the Optimal Parameter Prediction Unit 402. If the iterations are to continue, the Optimal Parameter Prediction Unit 402 retrieves new values of transcoding parameters from the data-set and forwards these to the Second Quality-Aware Parameter Selection Unit 404. Otherwise, only the predicted quality of the output image is retrieved from the data-set and forwarded to the Second Quality-Aware Parameter Selection Unit 404 that outputs this value in conjunction with the output image (produced in the final iteration) as well as the QFT and zT values used in the final iteration. The output image is termed "near-optimal" because it was produced by transcoding parameters with values that are close to the average optimal values recorded in the data-set. Experimental analysis of the system described later in this document shows that the quality metric for this "near optimal" image is indeed close to the quality metric for the output image obtained from optimal quality transcoding.

Figure 5:
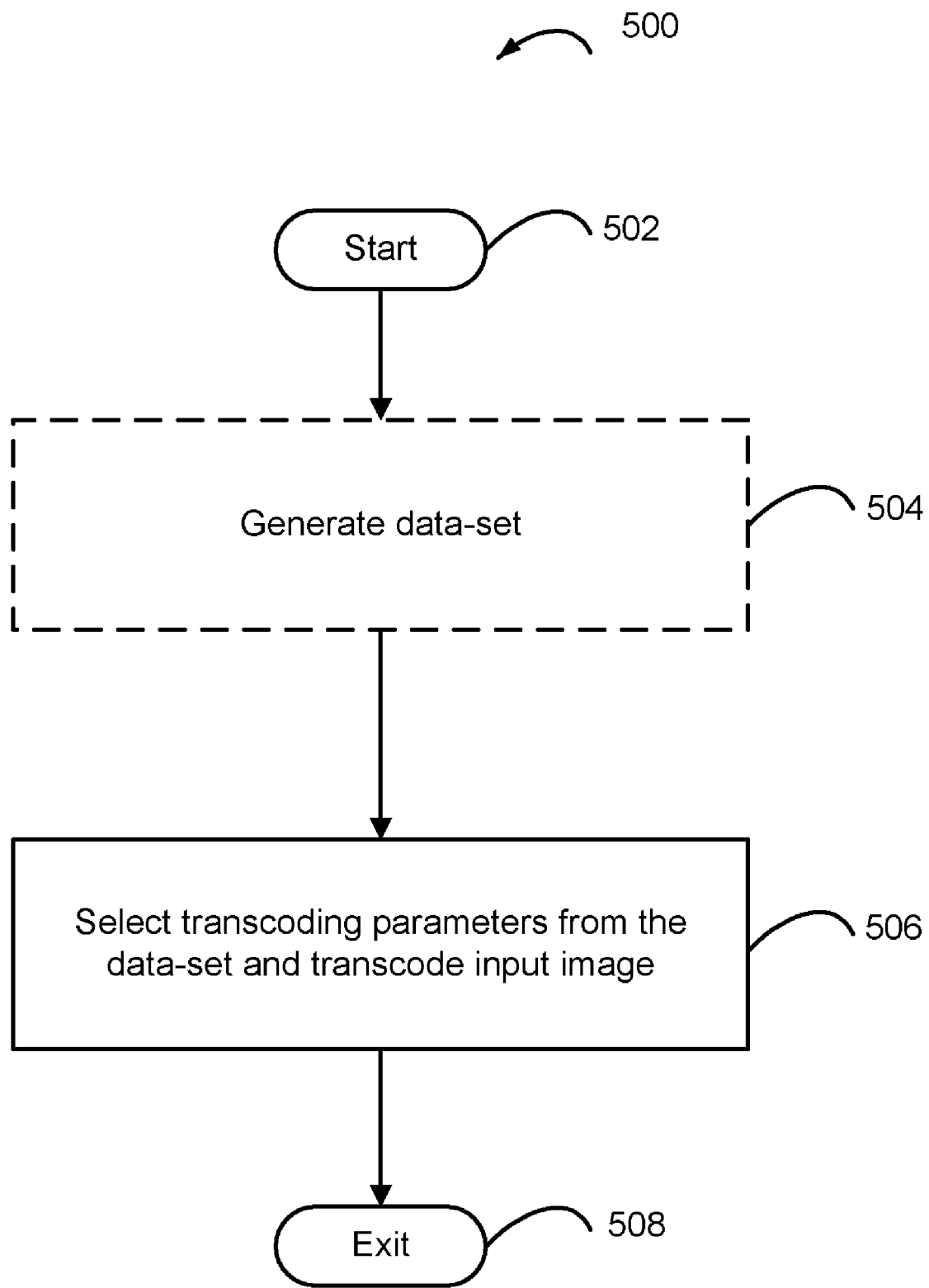
FIG. 5 presents a flow chart for illustrating the steps of the method for transcoding of input image into an output image for display on a terminal in accordance with the embodiment of the invention.

The steps of the method for transcoding of an input image into an output image for display on a terminal, are explained with the help of flowchart 500 presented in FIG. 5. The method comprises two steps. The step of the method described in box 504 is performed only once, prior to the transcoding of the input image, whereas the step of the method described in box 506 is performed during the transcoding of the input image. Please note that when deployed to transcode images in multimedia streams, the procedure can go on performing the operations in box 506 for multiple input images that are part of the multimedia streams.

Upon start (502), the procedure 500 uses a training image set stored in the Training Image Repository 202 to generate the data-set containing the average optimal transcoding parameters and the average image quality corresponding to the various combinations of terminal characteristics and features of the training images (box 504). The dashed box signifies that this operation is performed off-line by the Off-line Data-Set Generator 204 prior to performing the transcoding operations of the MMS images. After the generation of the data-set, during the processing of the MMS messages (performed by the On-Line Transcoder 208, the procedure 500 selects the transcoding parameters from the data-set (box 506) and transcodes the input image. The procedure 500 concludes at the end of the operation performed by box 506 and exits (box 508).

Figure 6:
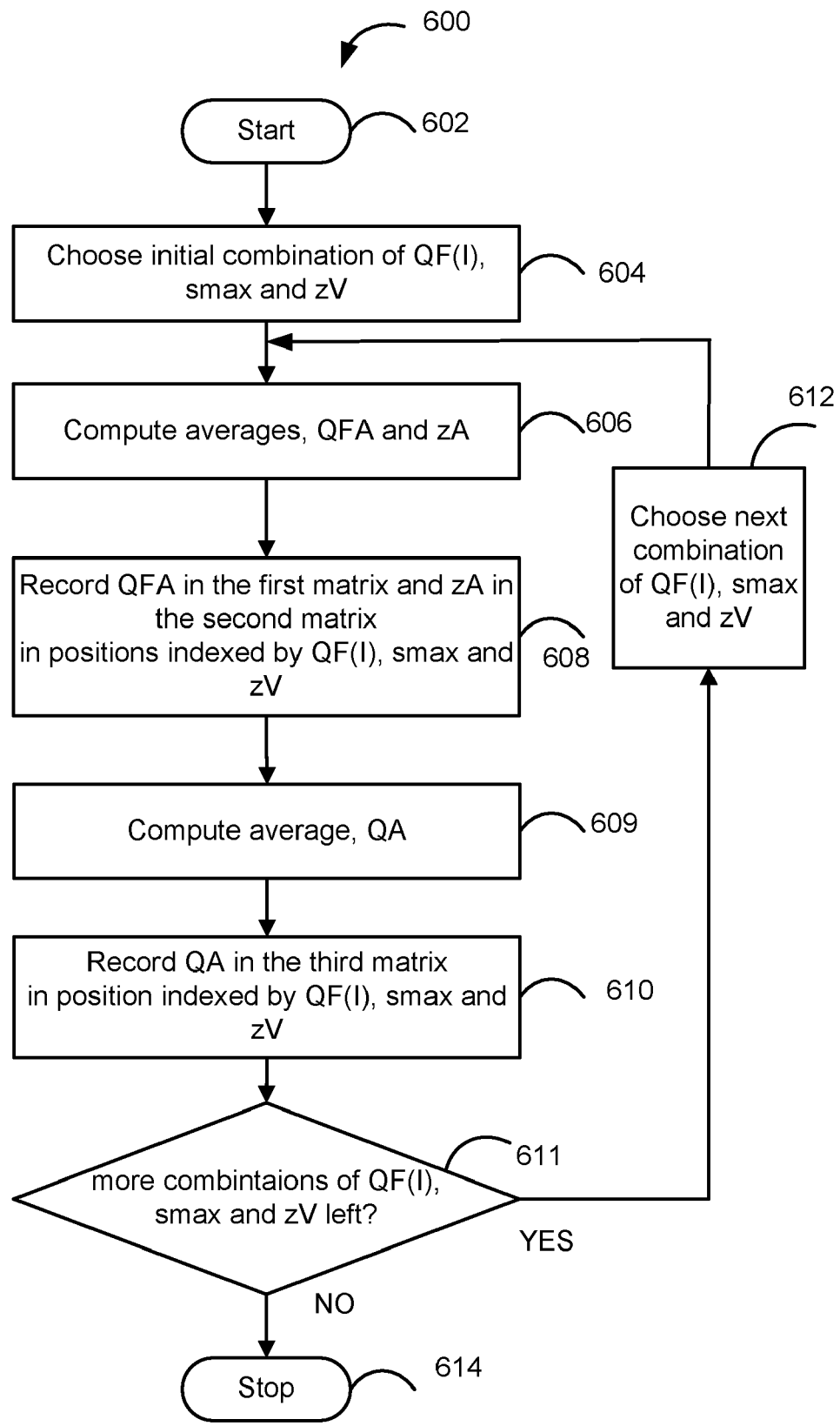
FIG. 6 presents a flow chart for illustrating the step "Generate data-set" of FIG. 5.

The step "Generate data-set" (box 504) of FIG. 5 is explained further with the help of flowchart 600 displayed in FIG. 6. The goal of the procedure 600 is to generate optimal transcoding parameters and image quality for various combinations of QF(I), smax and zV, the values of which are varied in fixed intervals. As discussed earlier, the parameter smax characterizes the relative size of an image obtained after transcoding (e.g. the transcoded training image and the output image) with respect to the size of the image that is transcoded (e.g. the training image or the input image). It is defined as the maximum acceptable relative size for an image after transcoding given a particular terminal and is given by:

$$smax=\min((S(D)/S(I)),1)$$

where I is the image being transcoded and D is the terminal on which the transcoded image is to be displayed.

Upon start (box 602), the procedure 600 chooses an initial combination of the three parameters QF(I), smax and zV (box 604). The procedure 600 then computes the average values for the optimal transcoding parameters QFA and zA for the combination (box 606). The values of QFA and zA are stored in the first and the second matrices respectively (box 608). The positions in the first and the second matrices indexed by the values of QF(I), smax and zV used in this iteration are used to store these values. The average image quality metric, QA, is computed next (box 609) and stored in the third matrix in the position indexed by the values of QF(I), smax and zV used in this iteration (610). The procedure 600 then checks whether there are more combinations of QF(I), smax and zV need to be considered (box 611). If yes, the procedure 600 exits 'YES' from box 611, chooses the next combination of QF(I), smax and zV (box 612) and loops back to the start of box 606. Otherwise, the procedure 600 exits 'NO' from box 611 and exits (box 614).

Figure 7:
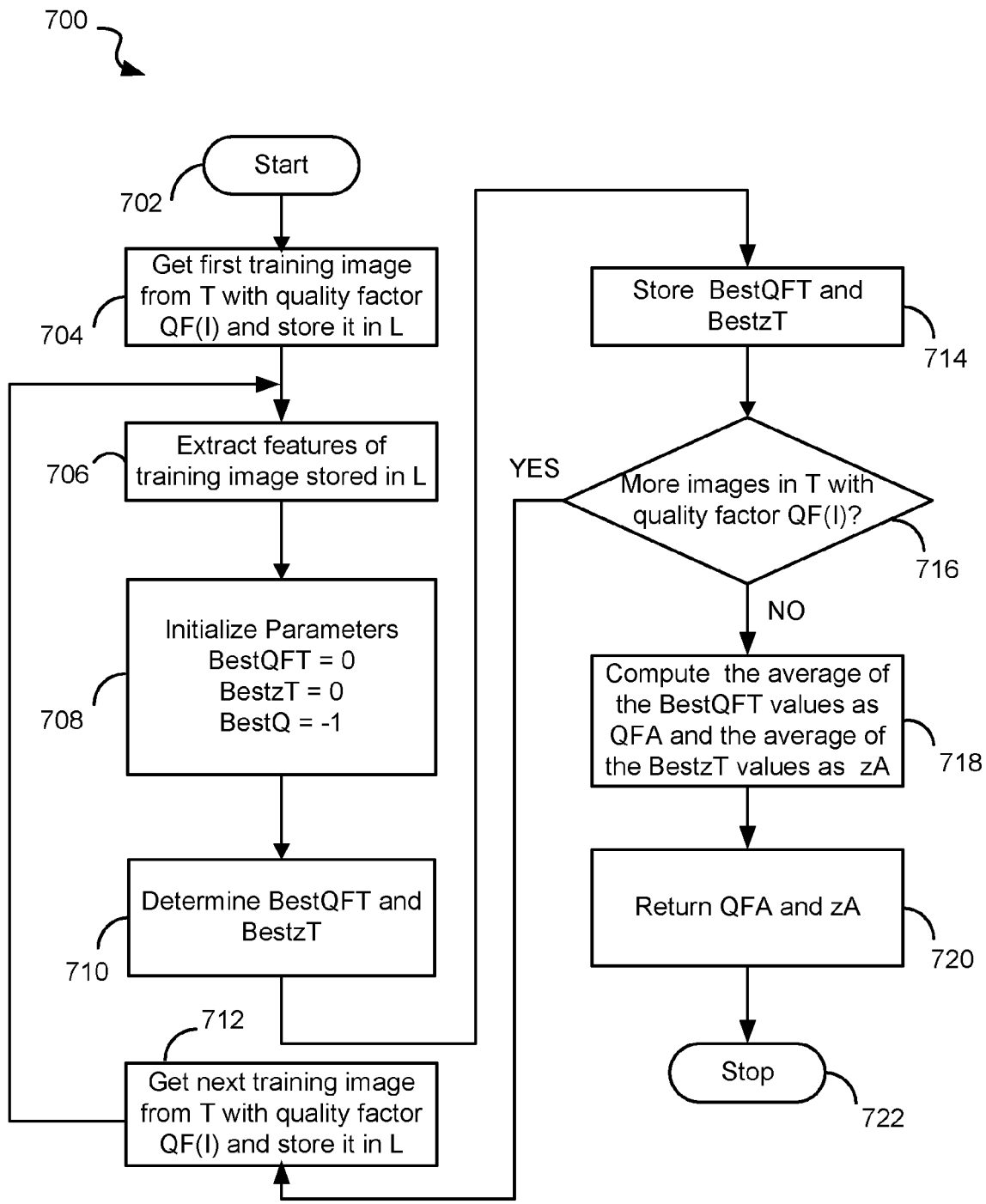
FIG. 7 presents a flowchart for illustrating the step "Compute averages, QFA and zA" of FIG. 6.

The step of the method "Compute averages, QFA and zA" (box 606) of FIG. 6 is explained with the help of the flowchart 700 presented in FIG. 7.

Upon start (box 702), the procedure 700 gets the parameters, zV and smax (box 702) that correspond to the parameter combination chosen in procedure 600 and represent the constraints imposed by the terminal characteristics. The procedure 700 then prepares to start an iteration for processing each training image in the training image set T that has a quality factor QF(I). The first training image from T is stored in L (box 704). Please note that the image stored in L is also referred to as image L. Then the procedure 700 extracts the features of the training image stored in L (box 706) and initializes parameters (box 708) to compute the best values of QFT and zT to be used for transcoding the training image stored in L for meeting the terminal constraints (box 710). The best value of QFT, BestQFT, and the best value of zT, BestzT, are the transcoding parameters that correspond to optimal quality transcoding of a training image in the training image set T, that produces a highest quality transcoded training image, while satisfying the characteristics of the terminal captured in the following constraints:

$$zT \leq zV$$

$$S(\tau(L, QFT, zT)) \leq smax$$

These best values of QFT and zT are stored (box 714) and the procedure 700 checks where there are more training images in T with a quality factor equal to QF(I) (box 716). If so, the procedure 700 exits 'YES' from box 716, stores the next image from T in L and loops back to the entry of box 706 (box 712). Otherwise, the procedure 700 exits 'NO' from box 716, computes the average values, QFA and zA, from the subset of training images with quality factor equal to QF(I) (box 718), returns these values (box 720) and exits (box 722).

The average values of the optimal transcoding parameters are computed by using the training images in the training image set T in the following way:

$$QFA = (1/N) \Sigma_{L \in TQFI} QFT_{best}(L)$$

And $zA = (1/N) \Sigma_{L \in TQFI} zT_{best}(L)$

Where TQFI is the subset of T containing training images with a quality factor equal to QF(I), N is the cardinality of this subset and $QFT_{best}(L)$ and $zT_{best}(L)$ are the BestQFT and Best zT values stored for the Lth training image in box 614 of the procedure 600 described earlier.

Please note that an alternate iterative procedure can be used in the computation of QFA and zA. During each iteration, Instead of storing the BestQFT and BestzT for each training image separately, the values of BestQFT and BestzT can be accumulated in variables BestQFTacc and BestZtacc in the following way:

$$BestQFTacc = BestQFTacc + BestQFT$$

$$BestzTacc = BestzTacc + BestzT$$

Since N such values of Best QFA and BestzT were accumulated:

$$QFA = BestQFTacc/N$$

$$ZA = BestzTacc/N$$

Figure 8:
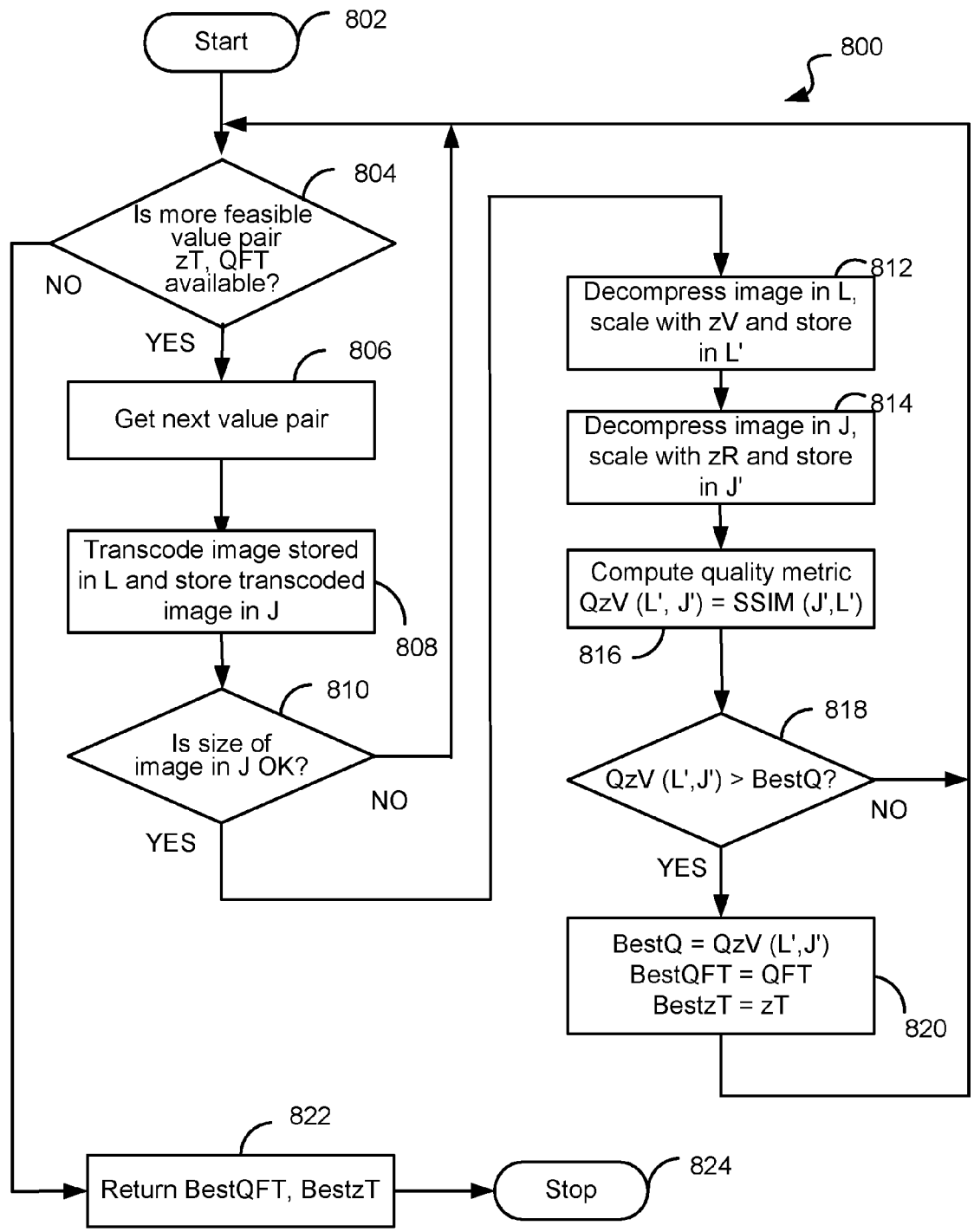
FIG. 8 presents a flowchart for illustrating the step "Compute BestQFT and Best zT" of FIG. 7.

The step of the method "Determine BestQFT and BestzT" (box 710) in FIG. 7 is explained further with the help of the flowchart 800 presented in FIG. 8. Procedure 800 varies zT and QFT in steps and generates all feasible combinations of these parameters to determine which parameter combination gives rise to the optimal quality for the transcoded training image (stored in J) for a given training image (stored in L). Upon start (box 802), the procedure 800 starts an iteration by checking whether more feasible zT, QFT pairs are available for transcoding (box 804). Please note that in order for such a pair to be feasible zT should be less than or equal to zV. If an additional feasible zT, QFT pair is available, the procedure 800 exits 'YES' from box 804, and gets the next zT, QFT pair (box 806). The given training image is then transcoded to a transcoded training image that is stored in J (box 808). The transcoded training image is referred to as J in the following discussion. The size of the transcoded training image J is checked next (box 810). If it does not meet the size constraints imposed by smax, procedure 800 exits 'NO' from box 810 and loops back to the entry of box 804. Otherwise, the procedure exits 'YES' from box 810 and decompresses the training image in L to produce an image stored in L' and referred to as L', using zV as the scaling factor (box 812). In the next step, the procedure 800 decompresses the transcoded training image J to produce an image stored in J' and referred to as J', using zR as the scaling-factor (box 814). Then the procedure 800 computes the quality metric QzV(L', J') by using the SSIM index (box 816). The higher the value of QzV(L', J'), the better is the quality of the transcoded training image. QzV(L', J') is then compared with the value stored in BestQ that contains the highest quality metric computed so far (box 818). If QzV(L', J') is higher then BestQ, the procedure 800 exits 'YES' from box 818, records the values of QzV(L', J'), QFT and zT in the variables BestQ, BestQFT, and BestzT respectively (box 820) and loops back to the entry of box 804. Otherwise, the procedure 800 skips the operations in box 820 and simply loops back to the entry of box 804. If the test made in box 804 returns false, there are no further zT, QFT pairs to be checked and the procedure exits 'NO' from box 804, returns the values stored in BestQ, BestQFT and BestzT (box 822) and exits (box 824).

Figure 9:
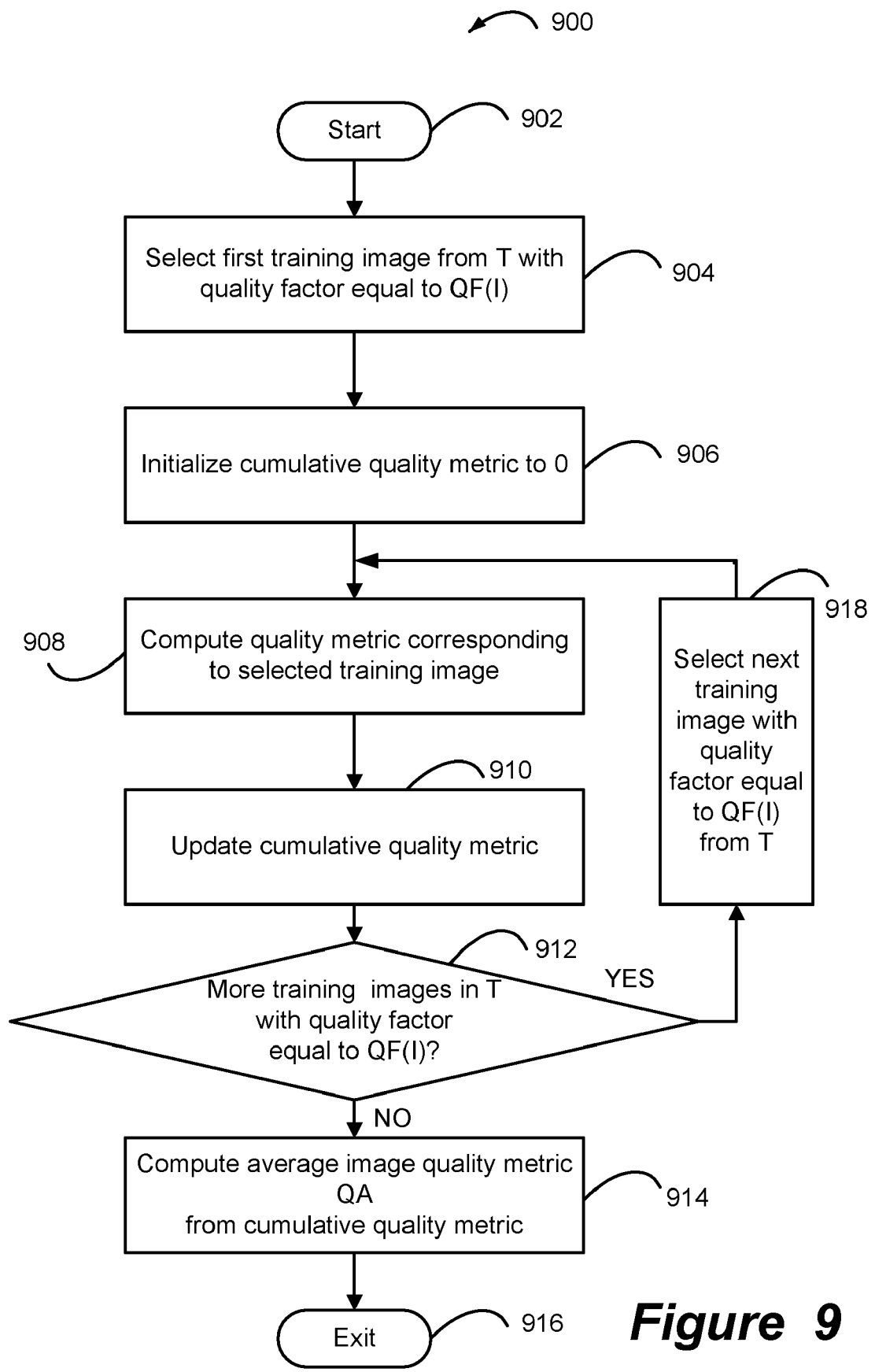
FIG. 9 presents a flowchart for illustrating the step "Compute average, QA" of FIG. 6.

The step "Compute average, QA" (box 609) presented in FIG. 6 is explained further with the help of flowchart 9 presented in FIG. 9. Upon start (box 902), the procedure 900 selects the first image with a quality factor equal to QF(I) form the training image set T (box 904). The cumulative quality metric is initialized to 0 next (box 906). The procedure 900 then computes the quality metric corresponding to the selected training image (box 908) by using the function determining the SSIM index and updates the cumulative quality metric accordingly (box 910). Whether or not there are more images with a quality metric QF(I) in T is checked next (box 912). If so, another image with such a quality factor is selected from T (box 918) and the procedure 900 loops back to the entry of box 908. Otherwise, the procedure 900 exits 'NO' from box 912, computes the value of QA from the cumulative quality metric (box 914) and exits (box 916). QA is computed as:

$$QA = \text{cumulative quality metric}/N$$

where N is the number of training images in the subset of training images with a quality factor equal to QF(I).

Figure 10:
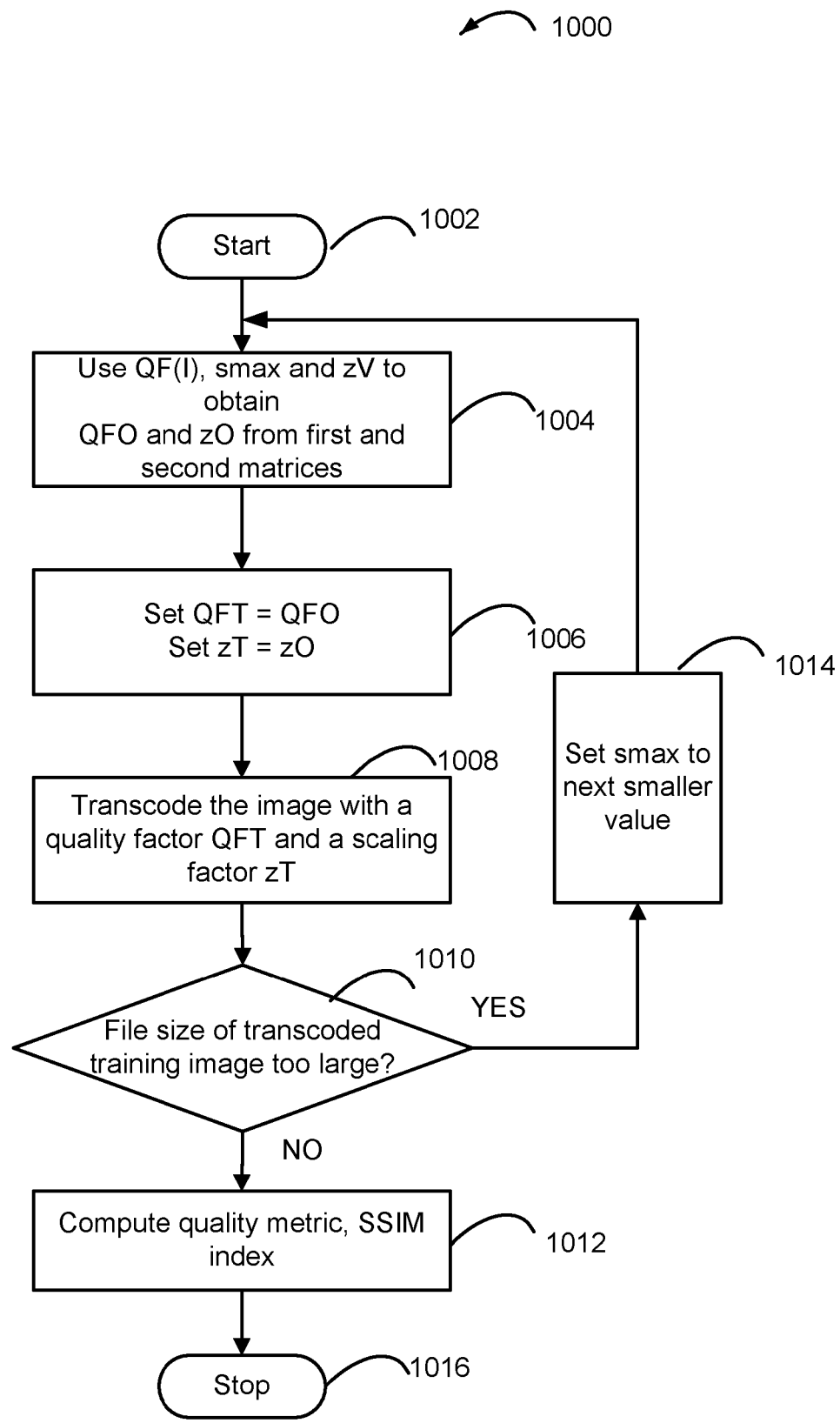
FIG. 10 presents a flowchart for illustrating the step "Compute quality metric corresponding to selected training image" of FIG. 9.

The step "Compute quality metric for selected training image" (box 908) of FIG. 9 is explained further with the help of flowchart 1000 presented in FIG. 10. Upon start (box 1002), the procedure 1000 gets the values of QFO and zO stored in the first and the second matrices respectively from positions indexed by the values of QF(I), smax, and zV (box 1004). The transcoding parameters are determined next: QFT is set to QFO and zT to zO (box 1006). The image is then transcoded using these values of QFT and zT (box 1008). Whether or not the file size for then transcoded training image is too large for the terminal is checked next (box 1010). If so, the procedure 1000 exits 'YES' from box 1010, sets the value of smax to the next smaller value used in the first and second matrices (box 1014) and loops back to the entry of box 1004. Otherwise, the procedure exits 'NO' from box 1010, computes the quality metric for the transcoded image by applying the function for determining the SSIM index (box 1012) and exits (box 1016). As discussed earlier, in order to compare the training image and the transcoded training image at equal resolution, both image must be scaled appropriately. The training image is scaled by using zV whereas the transcoded training image is scaled by using zR, with zV and zR satisfying the following relationship:

$$zV = zT * zR$$

Figure 11:
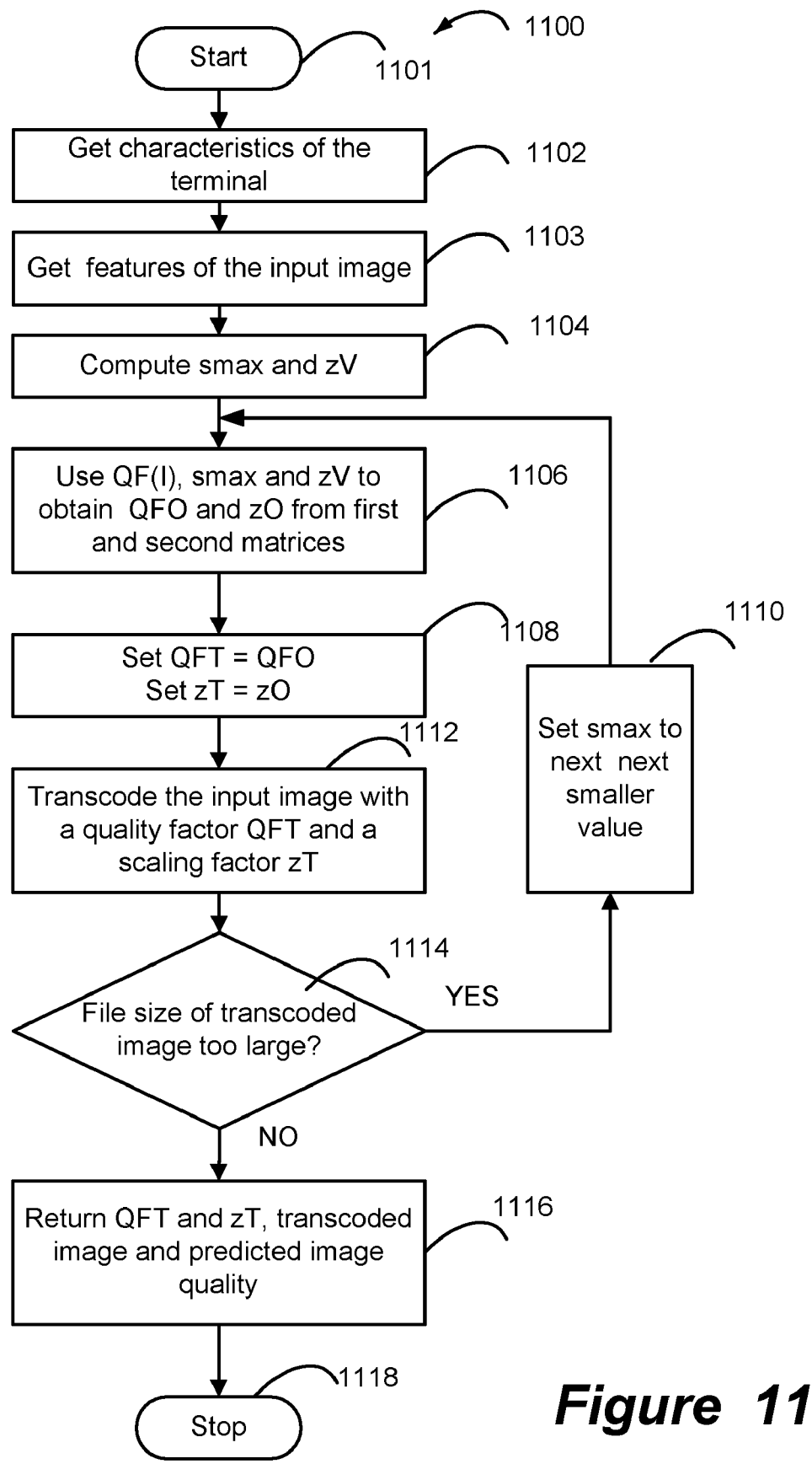
FIG. 11 presents a flowchart for illustrating the step "Select transcoding parameters from the data-set and transcode input image" of FIG. 5.

The step "Select transcoding parameters from the data-set and transcode input image" (box 506) in FIG. 5 is explained further with the help of flowchart 1100 presented in FIG. 11. Upon start (box 1101), the procedure 1100 gets the characteristics of the terminal (box 1102) and the features of the input image (box 1103). The values of smax and zV are then computed (box 1104) in the following way:

$$smax = \min((S(D)/S(I)), 1) \text{ and}$$

$$zV = \min((W(D)/W(I)), (H(D)/H(I)), 1)$$

Such a value of smax corresponds to the maximum acceptable relative size for image I given terminal D where as the zV selected leads to the maximum resolution supported by the terminal.

An iteration to determine the transcoding parameters to achieve near-optimal image quality for the transcoded image is started by reading the values of QFO and zO from the first and the second matrices (box 1106) indexed by QF(I), smax and zV. QFT is then set to QFO and zT to zO (box 1108). The input image is then transcoded with a quality factor equal to QFT and a scaling factor zT (box 1112). The size of the file for the transcoded image is checked next (box 1114). If the size is too large to satisfy the constraints imposed by the terminal characteristics, the procedure 1100 exits 'YES' from box 1114, identifies the next smaller value of smax in the first and second matrices and loops back to the entry of box 1106. Otherwise, the procedure 1100 exits 'NO' from box 1114, returns the predicted image quality, the values of QFT, and zT used in transcoding as well as the last transcoded image (box 1116) and exits (box 1118). The predicted image quality is simply retrieved from the third matrix by using QF(I), smax and zV as index variables.

Please note that an important feature of the method of the embodiment of the invention is the pre-computing and storing of the predicted quality metrics for images. As the SSIM index used in the determination of the quality metric is expensive to compute, it should be pre-computed into an array the indices of that are quantized parameters. These quantized parameters include the quantized zV, the quantized QF(I), and the quantized smax. Quantization of a parameter leads to grouping of parameter values that are close to each other and representing these by a single value. In order to achieve the pre-computation, the images in the image training set T is used. For each training image L in T, a large number of transformations is applied using different QFT and zT that are varied in fixed intervals, The resulting image file size and quality metric for the transcoded training image were recorded. For each of the transcodings, a feature vector, t, containing the training image L, QF(L), W(L), H(L), S(L), QFT, zT, the viewing scaling factor zV, the resulting file size of the transcoded training image, $S(\tau(L, QFT, zT))$, as well as the quality metric for the transcoded training image, QzV (L, T (I,QFT, zT)), at a viewing condition represented by the viewing scaling factor zV is formed. Let all these vectors form the transcoded image set U.

The quality prediction, based on the SSIM index, for a quantized QF(I), a quantized QFT, a quantized zT and a quantized zV is given by:

$$SSIM\text{-}Q = (1/M) \Sigma_{t \in U'} SSIM(R(L(t), zV(t)), R(T(L(t), QFT(t), zT(t)), (zV/zT)))$$

Where, U' is the subset of all transcoded training images in the transcoded image set U the parameters of which fall in the quantization cells, quantized QF(I), quantized QFT, quantized zT and quantized zV, M is the cardinality of the set U', and L(t) returns the training image L, QFT(t) the transcoding QFT and zT(t) the transcoding scaling factor applied from the vector t.

An example of using the method and system of the embodiment of the invention in image transcoding is provided next. The data-set used is derived from a large number of images described by Steven Pigeon and Stephane Coulombe in "Computationally efficient algorithms for predicting the file size of JPEG images subject to changes of quality factor and scaling" in Proceedings of the 24th Queen's Biennial Symposium on Communications, Queen's University, Kingston, Canada, 2008. Since a large database of typical JPEG images sampled from multimedia applications was not available, a crawler was developed for the extraction of images from popular Web sites. The training image set assembled includes tens of thousands of JPEG files. It is free of corrupted files and all meta-data (EXIF) were removed. In order to generate the first, second and third matrices a number of transcoding operations on each training image was performed by using ImageMagick's command line tools described in "ImageMagick command-line tools" available from http://www.imagemagick.org/. A "slice" of each matrix that corresponds to a QF(I) of 80 is presented in FIGS. 12-14. Such a slice is a two-dimensional matrix indexed by zV and smax. These matrix slices are used in the example provided here.

Consider a device with S(D)=30500, W(D)=640, H(D)=480, and an input image I, Lena. with S(I)=43266, W(I)=512, H(I)=512 and QF(I)=80. Information regarding the image Lena is available from: http://sipi.usc.edu/database/database.cgi?volume=misc&image=12 http://www.cs.cmu.edu/~chuck/lennapg/

Step 1: Compute smax=min(30500/43266, 1)≈0.7 and zV=min(640/512, 480/512, 1)≈90%

Step 2: Using the first matrix slice presented in FIG. 12, yields QFT=first matrix slice [0.7, 90%]=70 (the rounded value of 69.3 to the parameters' resolution). Please note that the first matrix slice is a two-dimensional matrix corresponding to QF(I)=80. The rows of this two-dimensional matrix correspond to values of smax whereas the columns correspond to values of zV.

Using the second matrix slice presented in FIG. 13, yields zT=second matrix slice [0.7, 90%]=80%.

Please note that the second matrix slice is a two-dimensional matrix corresponding to QF(I)=80. The rows of this two-dimensional matrix correspond to values of smax whereas the columns correspond to values of zV.

Step 3: Transcode the image with the quality factor equal to QFT and a scaling factor equal to zT.

After transcoding, an output image with a relative image file size of 0.53 with respect to the input image is obtained.

Step 4: Since the transcoded image meets the constraint imposed by the terminal characteristics on image file size (0.53<0.70), we go to step 5.

Step 5: Return near-optimal parameters QFO=70 and zO=80%, the output image obtained by using these parameters, $\tau$(I, 70, 80%), and the predicted image quality for the transcoded image=0.84 that is read from the third matrix slice presented in FIG. 14 (third matrix slice [[0.7, 90%]=0.84]).

Performing an optimal quality transcoding on the input image leads to an image quality of 0.85. Therefore, for Lena, we obtained an image with near-optimal quality (0.84 versus 0.85, a≈1% error). The simulation experiment was repeated with a large number of other images and each experiment resulted in a very small error.

The embodiments of the invention provide the following advantages:

A high quality output image close to that achieved from optimal quality transcoding of the input image is achieved;

The time required for transcoding is much smaller in comparison to that required for optimal quality transcoding;

It follows from the two above noted advantages, a much higher MMS message rate in comparison to an optimal quality transcoding system can be sustained by the image while producing an output image of comparable quality; and The failure rate, which is an indicator of how often the system can not find a solution that meets the constraints, can be engineered to any desired low value.

Although specific embodiments of the invention have been described in detail, it should be understood that the described embodiments are intended to be illustrative and not restrictive. Various changes and modifications of the embodiments shown in the drawings and described in the specification may be made within the scope of the following claims without departing from the scope of the invention in its broader aspect. For example, quality metrics other than SSIM described in this document can be used in the measurement of image quality. Although the discussion presented in this application focuses mainly on JPEG images, the methods and system of the embodiments of the invention can be adapted to handle digital images encoded with other formats, such as Graphics Interchange Format (GIF) and Portable Network Graphics (PNG). In case of a GIF image for example, the number of colours in the image needs to be used in place of QF(I), QFT and QFA in the method and system for transcoding of an input image into an output image.

Although the embodiments of the invention have been described in detail, it will be apparent to one skilled in the art that variations and modifications to the embodiment may be made within the scope of the following claims.

What is claimed is:

1. A method for transcoding of an input image into an output image for display on a terminal, the method comprising:
employing at least one hardware processor for:
(a1) prior to the transcoding, generating a data-set, comprising transcoding parameters generated by performing an optimal quality transcoding of a set of training images in a training image set T to produce a highest quality transcoded training image for each training image, while satisfying the characteristics of the terminal;
(b1) extracting features of the input image and obtaining characteristics of the terminal;
(c1) selecting the transcoding parameters from the data-set generated in the step (a1) by using the characteristics of the terminal and the features of the input image extracted in the step (b1); and
(d1) transcoding the input image into the output image by using the transcoding parameters selected in the step (c1).

2. The method of claim 1, wherein the step (a1) further comprises generating a data-set, comprising transcoding parameters corresponding to combinations of characteristics of the terminal and features of the input image.

3. The method of claim 2, wherein the step (b1) further comprises extracting the features of the input image, including a quality factor QF(I) characterizing fidelity of encoding for the input image, an image file size S(I), an image width W(I), and an image height H(I).

4. The method of claim 3, wherein the step (c1) of selecting the transcoding parameters further comprises selecting a transcoding quality factor QFT characterizing fidelity of encoding for the output image, and a transcoding scaling factor zT characterizing a change in image resolution due to the transcoding.

5. The method of claim 4, wherein the data-set generated in the step (a1)) comprises N multi-dimensional matrices, comprising one or more of the following:
a first matrix storing an average optimal quality factor QFA for one or more subsets of the training images from the training image set T, each QFA being determined as an average of the QFT used during the optimal quality transcoding of the training images in a respective subset of the training images;
a second matrix storing an average optimal scaling factor zA for one or more subsets of the training images, each zA being determined as an average of the zT used during the optimal quality transcoding of the training images in a respective subset of the training images; and
a third matrix storing an average image quality metric QA for one or more subsets of the training images, each QA being determined as an average of quality metrics, indicating a degree of similarity between the training images and respective highest quality transcoded training images generated during the optimal quality transcoding, for a respective subset of the training images.

6. The method of claim 5, wherein each matrix is indexed by two or more of the following indices:
a first index, indicating the quality factor QF(I) of the input image;
a second index, indicating a viewing scaling factor zV characterizing a change in image resolution due to viewing conditions for the output image; and
a third index, indicating a maximum relative image size "smax" characterizing relative size of the output image with respect to the input image.

7. The method of claim 6, wherein the step (a1)) further comprises:
(a7) selecting a combination of the QF(I), the zV and the "smax";
(a7-i) for the selected combination of the zV and the "smax", generating the average optimal quality factor QFA and the average optimal scaling factor zA using a subset of the training images whose quality factor equals QF(I);

(a7-ii) storing the QFA in the first matrix, and the zA in the second matrix, in positions indexed by the selected combination of the QF(I), the zV and the "smax"; and (a7-iii) varying the QF(I), the zV and the "smax" in predetermined intervals, and repeating the steps between (a7) and (a7-iii), including the step (a7), until all combinations of the QF(I), the zV and the "smax" have been used.

8. The method of claim 7, further comprising:

(a8-i) for the selected combination of the zV and the "smax", generating the average image quality metric QA using a subset of the training images whose quality factor equals QF(I), including determining the quality metric for the highest quality transcoded training image for each training image in the subset of the training images; and (a-8ii) storing the QA in the third matrix in a position indexed by the selected combination of the QF(I), the zV and the "smax";

the steps (a8-i) and (a8-ii) being performed after the step (a7) and before the step (a7-iii).

9. The method of claim 8, wherein the step (a8-i) further comprises:

(a15) retrieving the average optimal quality factor QFA stored in the first matrix and the average optimal scaling factor zA stored in the second matrix;

(a15-i) transcoding the training image using the QFA and the zA retrieved in the step (a15) to produce the transcoded training image;

(a15-ii) determining whether the transcoded training image satisfies the characteristics of the terminal;

(a15-iii) repeating the steps between (a15) to (a15-iii), including the step (a15), with next smaller value of the "smax" available in the first and the second matrices until the transcoded training image satisfies the characteristics of the terminal; and (b15) determining the quality metric of the transcoded training image generated in step (a15-i) that satisfies the characteristics of the terminal.

10. The method of claim 9, wherein the step (a15-ii) further comprises determining whether an image file size of the transcoded training image is lower or equal to a maximum image file size S(D) supported by the terminal.

11. The method of claim 10, wherein the step (d1) further comprises:

(a17) determining the zV and the "smax" using the features of the input image, QF(I), S(I), W(I) and H(I) extracted in the step (b1) and the characteristics of the terminal;

(b17) retrieving the average optimal quality factor QFA stored in the first matrix, and the average optimal scaling factor ZA stored in the second matrix indexed by the QF(I) retrieved in the step (b1), and the zV and the "smax" determined in the step (a17);

(b17-i) transcoding the input image using the QFA and the zA retrieved in the step (b17) as the transcoding quality factor QFT and the transcoding scaling factor zT respectively, to produce the output image;

(b17-ii) checking whether the output image satisfies the characteristics of the terminal; and (b17-iii) repeating the steps between (b17) to (b17-iii), including the step (b17), with next smaller values of the "smax" available in the first and the second matrices until the output image satisfies the characteristics of the terminal; and (c17) retrieving the average image quality QA stored in the third matrix in a position indexed by the QF(I), the smax and the zV corresponding to the output image generated in the step (b17-i) that satisfies the characteristics of the terminal.

12. The method of claim 11, wherein the characteristics of the terminal comprise the maximum image file size S(D), a terminal width W(D) and a terminal height H(D), the step (a17) further comprising:

(a18) setting the zV to a minimum of (W(D)/W(I)), (H(D)/H(I)) and 1; and (b18) setting the "smax" to a minimum of (S(D)/S(I)) and 1.

13. The method of claim 7, wherein the step (a7-i) further comprises:

(a9) for each training image in the subset of the training images, determining the transcoding quality factor QFT and the transcoding scaling factor zT that produce the highest quality transcoded training image; and (b9) determining the average optimal quality factor QFA and the average optimal scaling factor zA using the transcoding quality factors QFT and the transcoding scaling factors zT for the training images determined in the step (a9).

14. The method of claim 13, wherein the step (a9) further comprises:

(a10) selecting the transcoding parameters, comprising a combination of the transcoding quality factor QFT, and the transcoding scaling factor zT;

(a10-i) for the selected combination of the QFT and the zT, transcoding the training image to produce the transcoded training image;

(a10-ii) determining a quality metric for the transcoded training image generated in the step (a10-i), indicating a degree of similarity between the training image and the transcoded training image;

(a10-iii) varying the QFT and the zT in predetermined intervals, and repeating the steps between (a10) to (a10-iii), including the step (a10), until all combinations of the QFT, and the zT have been used; and (a10-iv) selecting the QFT and the zT that produced the highest quality metric in the step (a10-ii).

15. The method of claim 14, wherein the step a-10(i) further comprises:

(a11)) decompressing and scaling the training image by applying the selected scaling factor zT; and (b11) compressing the decompressed and scaled training image produced in the step (a11)) by applying the selected quality factor QFT.

16. The method of claim 14, wherein the step (a-10ii) further comprises:

(12a) decompressing and scaling the transcoded training image by applying a re-scaling factor zR, for producing an image J';

(12b) decompressing and scaling the transcoded training image by applying the viewing scaling factor zV for producing an image L'; and (12c) generating the quality metric indicating the degree of similarity between the training image and the transcoded training image by using the images J' and L' respectively.

17. The method of claim 16, wherein the zR equals zV/zT.

18. The method of claim 16, wherein the step 12(c) further comprises determining a Structural SIMilarity (SSIM) index, by using the image J' and the image L'.

19. The method of claim 4, wherein the step (a1)) further comprises:
- (a19) selecting the transcoding parameters, comprising a combination of the transcoding quality factor QFT, and the transcoding scaling factor zT;
- (a19-i) for the selected combination of the QFT and the zT, transcoding the training image to produce the transcoded training image;
- (a19-ii) determining a quality metric for the transcoded training image generated in the step (a19-i), indicating a degree of similarity between the training image and the transcoded training image;
- (a19-iii) varying the QFT and the zT in predetermined intervals, and repeating the steps between (a19) to (a19-ii), including the step (a19), until all combinations of the QFT, and the zT have been used; and
- (a19-iv) selecting the QFT and the zT that produced the highest quality metric in the step (a19-ii).

20. The method of claim 19, wherein the step a-19(i) further comprises:
- (a20) decompressing and scaling the training image by applying the selected scaling factor zT; and
- (b20) compressing the decompressed and scaled training image produced in the step (a20) by applying the selected quality factor QFT.

21. The method of claim 19, wherein the step (a-19ii) further comprises:
- (a21) decompressing and scaling the transcoded training image by applying a re-scaling factor zR, for producing an image J';
- (b21) decompressing and scaling the transcoded training image by applying a viewing scaling factor zV characterizing a change in image resolution due to viewing conditions for the output image, for producing an image L'; and
- (c21) generating the quality metric indicating the degree of similarity between the training image and the transcoded training image by using the images J' and L' respectively.

22. The method of claim 21, wherein the zR equals zV/zT.

23. The method of claim 21, wherein the step (c21) further comprises determining a Structural SIMilarity (SSIM) index, by using the image J' and the image L'.

24. The method of claim 2, wherein the step (b1) further comprises extracting the features of the input image, including a number of colours for the input image, an image file size S(I), an image width W(I), and an image height H(I).

25. A non-transitory computer readable storage medium, having a computer readable program code instructions stored thereon, for execution by a processor, to perform the steps of the method as described in claim 1.

26. A system for transcoding an input image into an output image for display on a terminal, the system comprising:
- at least one processor; and
- a non-transitory computer readable storage medium, having computer readable instructions stored thereon for execution by the at least one processor, forming:
  - (a24) a Training Image Repository comprising a training image set T including training images;
  - (b24) an Off-Line Data-Set Generator, generating a data-set prior to the transcoding of the input image, the data-set comprising transcoding parameters generated by an optimal quality transcoding of a set of the training images from the training image set T, producing a highest quality transcoded training image for each training image, while satisfying characteristics of the terminal;
  - (c24) a Data-Set Repository, storing the data-set produced by the Off-Line Data-Set Generator (b24); and
  - (d24) an On-Line Transcoder, selecting the transcoding parameters from the data-set stored in the Data-Set Repository (c24), by using the characteristics of the terminal and the features of the input image, and transcoding the input image into the output image by using the selected transcoding parameters.

27. The system of claim 26, wherein the data-set comprises transcoding parameters corresponding to combinations of the characteristics of the terminal and features of the input image.

28. The system of claim 27, wherein the transcoding parameters comprise a transcoding quality factor QFT characterizing fidelity of encoding for the output image, and a transcoding scaling factor zT characterizing a change in image resolution due to the transcoding.

29. The system of claim 28, wherein the data-set includes N multi-dimensional matrices, including one or more of the following:
- a first matrix storing an average optimal quality factor QFA for one or more subsets of training images from the training image set T, each QFA being determined as an average of the QFT used during the optimal quality transcoding of training images in a respective subset of the training images;
- a second matrix storing an average optimal scaling factor zA for one or more subsets of training images, each zA being determined as an average of the zT used during the optimal quality transcoding of training images in a respective subset of the training images; and
- a third matrix storing an average image quality metric QA for one or more subsets of the training images, each QA being determined as an average of quality metrics, indicating degree of similarity between the training images and corresponding highest quality transcoded training images generated during the optimal quality transcoding, for a respective subset of training images.

30. The system of claim 29, wherein each matrix is indexed by two or more of the following indices:
- a first index, indicating a quality factor QF(I) characterizing fidelity of encoding for the input image;
- a second index, indicating a viewing scaling factor zV characterizing a change in image resolution due to viewing conditions for the output image; and
- a third index, indicating a maximum relative image size "smax" characterizing relative size of the output image with respect to the input image.

31. The system of claim 30, wherein the Off-Line Data-Set Generator (b24) further comprises:
- (a29) an Image Feature Extraction Unit, extracting features of a training image in the training image set T;
- (b29) a First Quality-Aware Parameter Selection Unit, selecting the QFT and the zT, and determining the average optimal quality factor QFA and the average optimal scaling factor zA by using the features extracted by the Image Feature Extraction Unit (a24);
- (c29) a Transcoding Unit, transcoding the training image into a transcoded training image by using the QFT and the zT selected by the First Quality-Aware Parameter Selection Unit (b29)-; and
- (d29) a Quality Assessment Unit, determining the quality metric for the transcoded training image generated by the Transcoding Unit (c-29), the quality metric indicating a degree of similarity between the training image and the transcoded training image.

32. The system of claim 31, wherein the First Quality-Aware Parameter Selection Unit (b29) further comprises a computational means for determining the average image quality metric QA.

33. The system of claim 31, wherein the Transcoding Unit (c29) further comprises:
- (a31) a Decompression and Scaling Unit, producing a decompressed and scaled training image by applying the scaling factor zT to the training image; and
- (b31) a Compression unit, producing the transcoded training image by applying the transcoding quality factor QFT to the decompressed and scaled training image.

34. The system of claim 31, wherein the Quality Assessment Unit (d29) further comprises:
- (a32) a Second Decompression and Scaling Unit, decompressing and scaling the transcoded training image by applying a re-scaling factor zR;
- (b32) a Third Decompression and Scaling Unit, decompressing and scaling the training image by applying the viewing scaling factor zV; and
- (c32) a Quality Metric Computation Unit, computing the quality metric for the transcoded training image.

35. The system of claim 29, wherein the Quality Metric Computation Unit (c32) further comprises a computational means for determining a Structural SIMilarity (SSIM) index indicating similarity between the training image and the transcoded training image.

36. The system of claim 29, wherein the On-Line Transcoder (d24) further comprises:
- (a34) an Image Feature Extraction Unit, extracting the features of the input image;
- (b34) an Optimal Parameter Prediction Unit, retrieving the average optimal quality factor QFA stored in the first matrix, and the average optimal scaling factor zA stored in the second matrix by using the features of the input image extracted by the Image Feature Extraction Unit (a34) and the characteristics of the terminal;
- (c34) a Second Quality-Aware Parameter Selection Unit, determining the transcoding quality factor QFT and the transcoding scaling factor zT by using the QFA and the zA retrieved by the Optimal Parameter Prediction Unit (b34)), and retrieving the average image quality QA stored in the third matrix; and
- (d34) a Transcoding Unit, transcoding the input image into the output image by using the QFT and the zT selected by the Second Quality-Aware Parameter Selection Unit (c34).

37. A system for transcoding an input image into an output image for display on a terminal, the system comprising:
- a plurality of computing nodes connected by a communication network, each node comprising a processor and a computer readable storage medium, having computer readable instruction stored thereon for execution by the processor of said each node, forming:
- (a36) a Training Image Repository comprising a training image set T including training images stored in a computer readable storage medium of a first node;
- (b36) an Off-Line Data-Set Generator comprising computer readable instructions stored in a computer readable medium of a second node for generating a data-set prior to the transcoding of the input image, the data-set comprising transcoding parameters generated by an optimal quality transcoding of a set of the training images from the training image set T, producing a highest quality transcoded training image for each training image, while satisfying characteristics of the terminal;
- (c36) a Data-Set Repository, storing the data-set produced by the Off-Line Data-Set Generator (b36) in a computer readable storage medium of a third node; and
- (d36) an On-Line Transcoder comprising computer readable instructions stored in a computer readable medium of a fourth node, for selecting the transcoding parameters from the data-set stored in the Data-Set Repository (c36), by using the terminal characteristics and the features of the input image, and transcoding the input image into the output image by using the selected transcoding parameters.

* * * * *

UNITED STATES PATENT AND TRADEMARK OFFICE
CERTIFICATE OF CORRECTION

PATENT NO. : 8,300,961 B2  
APPLICATION NO. : 12/333406  
DATED : October 30, 2012  
INVENTOR(S) : Stephane Coulombe et al.

Page 1 of 1

It is certified that error appears in the above-identified patent and that said Letters Patent is hereby corrected as shown below:

Column 20, line 3, "the characteristics" should read --characteristics--.

Column 20, line 5, "obtaining" should read --obtaining the--.

Column 20, line 16, "of characteristics" should read --of the characteristics--.

Column 20, line 17, "and features" should read --and the features--.

Column 22, line 45, "(a11))" should read --(a11)--.

Column 22, line 48, "(all)" should read --(a11)--.

Column 23, line 7, "the training image to produce the" should read --a training image to produce a--.

Column 23, line 16, "QFT, and" should read --QFT and--.

Column 24, line 4, "the features" should read --features--.

Column 24, line 9, "and features" should read --and the features--.

Column 25, line 19, "claim 29" should read --claim 34--.

Column 26, line 1, "(b34))" should read --(b34)--.

Column 26, line 33, "terminal characteristics" should read --characteristics of the terminal--.

Signed and Sealed this  
Eighteenth Day of December, 2012

David J. Kappos  
*Director of the United States Patent and Trademark Office*

UNITED STATES PATENT AND TRADEMARK OFFICE
CERTIFICATE OF CORRECTION

PATENT NO. : 8,300,961 B2
APPLICATION NO. : 12/333406
DATED : October 30, 2012
INVENTOR(S) : Stephane Coulombe et al.

It is certified that error appears in the above-identified patent and that said Letters Patent is hereby corrected as shown below:

IN THE SPECIFICATION

Column 11, line 35, "characaterizing" should read --characterizing--

Signed and Sealed this
Twelfth Day of January, 2016

Michelle K. Lee
*Director of the United States Patent and Trademark Office*